US006836752B2

(12) United States Patent
Atasoy

(10) Patent No.: US 6,836,752 B2
(45) Date of Patent: *Dec. 28, 2004

(54) METHOD AND APPARATUS FOR SEARCHING AND RETRIEVING ARCHITECTURAL INFORMATION FOR DESIGN OF ARCHITECTURAL PROJECTS

(75) Inventor: Pelin Atasoy, Kensington, MD (US)

(73) Assignee: Computecture Inc., McLean, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/363,229

(22) Filed: Jul. 20, 1999

(65) Prior Publication Data

US 2003/0097240 A1 May 22, 2003

(51) Int. Cl.[7] ............................................... G06F 17/10
(52) U.S. Cl. ................................ 703/1; 703/6; 705/30; 705/1
(58) Field of Search .......................... 434/323; 713/201; 717/121; 703/1, 2, 6; 707/506, 511, 104.1; 709/226, 231; 705/10, 400; 714/35; 345/629

(56) References Cited

U.S. PATENT DOCUMENTS

| | | | | |
|---|---|---|---|---|
| 4,885,694 A | * | 12/1989 | Pray et al. | 705/400 |
| 4,964,060 A | * | 10/1990 | Hartsog | 703/1 |
| 5,189,606 A | * | 2/1993 | Burns et al. | 705/10 |
| 5,557,537 A | * | 9/1996 | Normann et al. | 703/1 |
| 5,893,125 A | * | 4/1999 | Shostak | 707/511 |
| 5,920,849 A | * | 7/1999 | Broughton et al. | 705/400 |
| 5,950,206 A | * | 9/1999 | Krause | 707/104.1 |
| 6,056,556 A | * | 5/2000 | Braun et al. | 434/323 |
| 6,236,409 B1 | * | 5/2001 | Hartman | 345/629 |
| 6,272,447 B1 | * | 8/2001 | Gavin et al. | 703/1 |

OTHER PUBLICATIONS

Washisaka et al., "Video/Text linkage system assisted by a concept dictionary and image recognition", IEEE Proceedings of Multimedia'96, Jun. 1996.*
Nordbotten et al., "Search patterns in hypertext exhibits", Proceedings of the 32nd Annual Hawaii International conference on System sciences, Jan. 1999.*
Devlin, J.F., "Rating Fire Resistance", Consulting–Specifying Engineer, Jul. 1998, pp. 68–69.*
Norris, M., "DocuDisc Fires up software to zip through Regulations Products Access Disabilities Act", Omaha World Herald, Oct. 23, 1995.*
Bodensteiner, P., "Fair housing refresher", Builder, Washington, Jun. 1999.*
Giammalvo, P.D., "Construction specification Institute's Masterformat", Cost Engineering, Jul. 1994.*

* cited by examiner

Primary Examiner—Kevin J. Teska
Assistant Examiner—K Thangavelu
(74) Attorney, Agent, or Firm—Hunton & Williams

(57) ABSTRACT

A method and apparatus for enabling computer aided design of architectural projects is provided that includes an area for storing building code resources, accessibility resources, and format resources. By inputting a selection of a predetermined search terms corresponding to one of physical environmental features, assembled building components, and building elements, a user is able to access the appropriate applicable regulations for that feature. Information from the resources is displayed on a display mechanism. Once the user has downloaded the applicable resources, navigation between the downloaded documents is made possible. In this manner, a user is able to obtain computerized assistance without being required to input an initial plan. Additionally, a customized search apparatus and method are provided. After selecting a term, the user can select the resource search described above or can select a customized search which aids in the selection of items to be used for building.

32 Claims, 27 Drawing Sheets

| Resource Storage Sub-System 200 | | |
|---|---|---|
| Building Code Resources Section 210 | Accessibility Resources Section 220 | Directories Section 230 |
| | Graphic Symbols Resource Section 250 | Formats Section 240 |

Fig. 2A

| Search Term Sub-System 300 | | |
|---|---|---|
| Physical Environmental Features Section 310 | Assembled Building Components Section 330 | Building Elements Section 350 |

Fig. 2B

| Custom Storage Sub-System 800 | | | |
|---|---|---|---|
| Categories Storage 810 | Subcategory Storage 820 | Criteria Storage 830 | |
| | | Item Storage 840 | |

Fig. 2C

| Building Code Resources Section 210 | | |
|---|---|---|
| BOCA 211 | UBC 212 | SBC 213 |
| NFPA 214 | State 215 | Local 216 |

Fig. 3A

| Accessibility Resources Section 220 | |
|---|---|
| ADA 221 | Fairhsng 222 |
| ANSI 223 | UFAS 224 |

Fig. 3B

| Directories Section 230 | |
|---|---|
| Fire 231 | Sounds 232 |

Fig. 3C

| Formats Section 240 |
|---|
| CSI Format 241 |

Fig. 3D

WALL SYMBOL
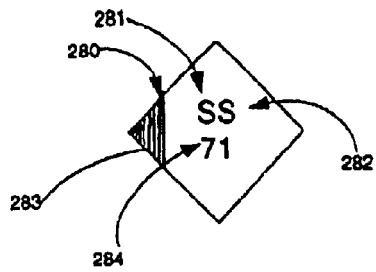
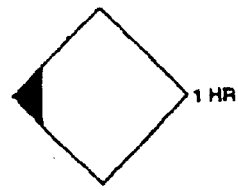 1 HR
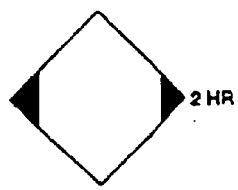 2 HR
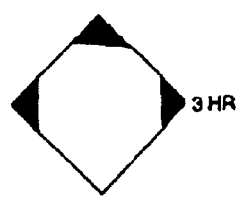 3 HR
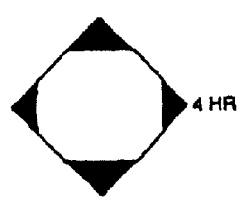 4 HR
Fig. 3G

| Physical Environment Section 310 | | | | |
|---|---|---|---|---|
| Building 311 | Interior 312 | Circulation/ Parking 313 | Common 314 | Units 315 |
| Kitchen 316 | Bath 317 | Storage 318 | Utility 319 | Exterior 320 |

Fig. 4A

| Assembled Building Components Section 330 | | | | |
|---|---|---|---|---|
| Framing 331 | Wall 332 | Floor 333 | Roof 334 | Vert Circ 335 |
| Window 336 | Door 337 | Mech 338 | Elec 339 | Plumb 340 |

MAD-CAD

Wall Type Selection

| Structural Material | Steel Stud ▼ | | Thickness ▼ | | New Search |
|---|---|---|---|---|---|
| | CMU | | | | |
| Location / Function | Concrete | | Location ▼ | | Position per grade ▼ | Single/Multi-Wythe ▼ |
| | Precast Conc. Panel | | | | |
| | Steel Furring Chan | | | | |
| Performance | Steel Stud ▼ | | Sound Rating ▼ | | Thermal Rating ▼ | Load Bearing/Non ▼ |

Wall Types satis... Wood ...iterias

| Wallid | Int_ext | Location | Material | Thickness |
|---|---|---|---|---|
| SS-13 | Interior | Partition | Steel Stud | 1 5/8" |
| SS-20 | Interior | Partition | Steel Stud | 2 1/2" |
| SS-21 | Interior | Partition | Steel Stud | 2 1/2" |
| SS-22 | Interior | Partition | Steel Stud | 2 1/2" |
| SS-23 | Interior | Partition | Steel Stud | 2 1/2" |
| SS-24 | Interior | Partition | Steel Stud | 2 1/2" |
| SS-25 | Interior | Partition | Steel Stud | 2 1/2" |
| SD-30 | Interior | Partition | Steel Stud | 3 5/8" |
| SD-31 | Interior | Partition | Steel Stud | 3 5/8" |

Selected Walls: SS-25

Building Codes
| BOCA | UBC |
| SBC | NFPA |
| State | Local |

Accessibility
| ADA | Fairhsng |
| ANSI | UFAS |

Directories
| Fire | Sound |

Formats
| CSI Master Format |

| Help | About |
| | Clear |
| | Exit Mad-Cad |

Physical Environment
| Building | Interior | Circ Park | Common | Roof | Units | Vert Circ | Window | Door | Bath WC | Kitch | Storage | Mech | Utility | Exterior |

Assembled Building Components
| Framing | Wall | Floor | | | | | | | | | | Elec | Plumb |

Building Elements
| 01 | 02 | 03 | 04 | 05 | 06 | 07 | 08 | 09 | 10 | 11 | 12 | 13 | 14 | 15 | 16 | Keyword Search |

Fig. 7C

MAD-CAD — Multitasking Architectural Database - [MAC-CAD]

Wall Type Selection

| | | |
|---|---|---|
| Structural Material | Steel Stud ▼ | Thickness 2 1/2" ▼ |
| Location / Function | Interior / Exterior ▼ Interior ▼ | |
| Performance | Fire Rating ▼ | |

New Search

Position per grade ▼ Single/Multi-Wythe ▼
Thermal Rating ▼ Load Bearing/Non ▼

Wall Types satisfies the selected c 5"

| WallId | Int_ext | Location | Material | Thickness |
|---|---|---|---|---|
| SS-21 | Interior | Partition | Steel Stud | 2 1/2" |
| SS-22 | Interior | Partition | Steel Stud | 2 1/2" |
| SS-23 | Interior | Partition | Steel Stud | 1 5/8" |
| SS-24 | Interior | Partition | Steel Stud | 2 1/2" |
| SS-25 | Interior | Partition | Steel Stud | 3 5/8" |
| SD-51 | Interior | Partition | Steel Stud | 4" |
| SS-61 | Interior | Partition | Steel Stud | 2 1/2" |
| SS-65 | Interior | Partition | Steel Stud | 2 1/2" |

Selected Walls
SS-25
SS-32

Physical Environment
| Building | Interior | Circ Park | Common | Roof | Units | Vert Circ | Window | Kitch | Bath WC | Storage | Mech | Door | Utility | Exterior | Plumb | Elec |

Assembled Building Components
| Framing | Floor | | | | | | | | | | | | | | |

Building Elements
| 01 | 02 | 03 | 04 | Wall | 06 | 07 | 08 | 09 | 10 | 11 | 12 | 13 | 14 | 15 | 16 |

Building Codes
BOCA | UBC
SBC | NFPA
State | Local

Accessibility
ADA | Fairhsng
ANSI | UFAS

Directories
Fire | Sound

Formats
CSI Master Format

Help | About
Clear
Exit Mad-Cad

Keyword Search

METHOD AND APPARATUS FOR SEARCHING AND RETRIEVING ARCHITECTURAL INFORMATION FOR DESIGN OF ARCHITECTURAL PROJECTS

BACKGROUND OF THE INVENTION

The present invention relates to a method and apparatus for searching and retrieving architectural information for design of architectural projects and for assisting in the selection of specific materials and items for use in architectural projects.

A variety of systems have been developed to assist in architectural project design. One such system is disclosed in U.S. Pat. No. 4,964,060 to Hartsog. Hartsog discloses a computer aided building plan review process which evaluates the compliance of development plans with building regulations and codes. The process will output a list of code non-complying items. It also designs working drawings and specifications using an automated computer process. The system further includes animated viewing of sites and structures and can generate detailed shop and sub-drawings, contracts, work schedules, lists of suppliers with availability dates, and check-off lists for inspections, required materials and the like.

A second related system is disclosed by Normann, et al., in U.S. Pat. No. 5,557,537. Normann discloses computerized methods and devices for designing and editing a distribution system for a building. Elements of the distribution systems and requirements of relevant standards are stored in the computer's memory. Building parameters and the standards to be followed are input by the user. The system computes the layout needed to comply with the selected standard and prints out a hard copy of the design layout which can include a listing of the elements needed to complete the system.

These prior systems require the user to input extensive data in order to obtain information. Further, these systems do not include a mechanism for providing access to all of the available codes and regulations that a designer would need in order to have a plan approved.

SUMMARY OF THE INVENTION

It is therefore, an object of the invention to provide a method and apparatus for searching and retrieving architectural information for enabling design of architectural projects such that a user can ensure early in the design process that all applicable regulations will be followed.

It is a further object of the invention to provide a system in which the user is not required to input design data in order to gain access to required information.

To achieve the objects in accordance with the purpose of the invention, as embodied and broadly described herein, an aspect of the invention provides the user with an option of performing a resource search or a customized search. The resource search is able to retrieve all information from the stored resources regarding a requested term. The customized search assists the user in selecting a particular item or building material based on criteria selected by the user.

In a further aspect, the invention provides an architectural design system that assists an architect in designing a building feature. The system includes a resource storage subsystem for storing building code resources, accessibility resources, and format resources. A search term storage subsystem is included for storing a plurality of predefined search terms corresponding to physical environmental features, assembled building components, and building elements. The system further includes a display subsystem having a search term display area for displaying one or more search terms selected by the user from the plurality of search terms stored in the search term storage means. The display subsystem further includes a resource selection display area for displaying one or more of the resources stored in the resource storage means. Finally, the display subsystem includes document viewing for displaying text from the selected resource. A user interface subsystem is included for selecting a term from the plurality of search terms stored in the search term storage subsystem and at least one resource from the plurality of resources stored in the resource storage subsystem. The system further includes processer for reviewing the selected resource to find information relative to the selected search term. The information found by the processer means is then displayed by the document viewing window.

In another aspect, the invention provides a method for designing a building feature using a computerized tool. The method includes the steps of selecting a search term from a plurality of pre-defined search terms corresponding to physical environmental features, assembled building components, and building elements, and determining whether desired resources from a resource storage means are enabled or available for use. Resources are considered to be enabled if they include information related to the selected search term. The desired resources may include building code resources, accessibility resources, and format resources. The method further includes the step of selecting at least one enabled resource if an enabled resource exists. The method further includes the step of viewing of a resultant display of the selected enabled resource in a document viewing window on a display mechanism. Finally, the method includes the steps of selecting a hypertext section from the resultant display in the document viewing window and creating a resultant document and reviewing the resultant document in the document viewing window.

The accompanying drawings, which are incorporated in and constitute part of this specification, illustrate one embodiment of the invention and, together with the description, serve to explain the principles of the invention.

BRIEF DESCRIPTION OF THE DRAWINGS

FIG. 2A is a block diagram showing the components of the resource storage subsystem of the system of the present invention;

FIG. 2B is a block diagram illustrating the components of the search term storage subsystem;

FIG. 2C is a block diagram illustrating the components of the custom storage subsystem;

FIG. 3A is a block diagram showing the components of the building code resources section of the resource storage subsystem;

FIG. 3B is a block diagram illustrating the components of an accessibility resources section of the resource storage subsystem;

FIG. 3C is a block diagram illustrating the components of a directories section of the resource storage subsystem;

FIG. 3D is a block diagram illustrating the components of a formats section of the resource storage subsystem;

FIG. 3G shows a preferred symbol format for the graphic symbol resources;

FIG. 4A is a block diagram illustrating the components of the physical environmental and features section;

FIG. 4B is a block diagram illustrating the components of the assembled building components section;

FIGS. 7A–7H are examples of the screen display sequence that occurs when a user progresses through the customized search method;

DESCRIPTION OF THE PREFERRED EMBODIMENT

Figure 1:
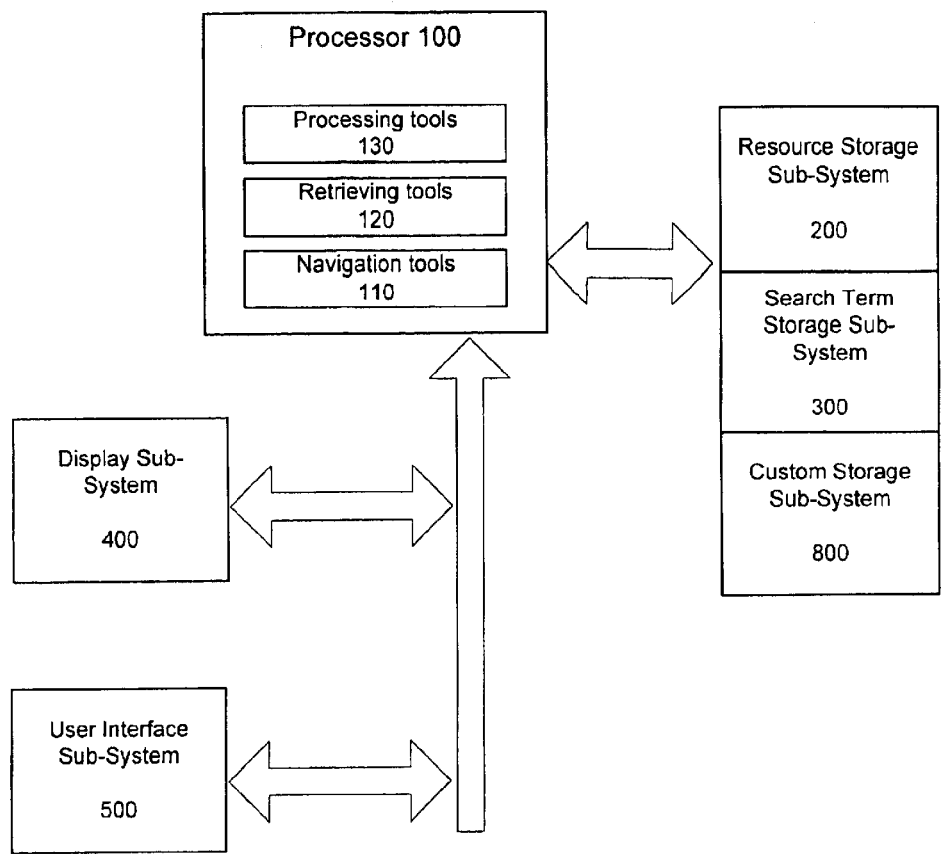
FIG. 1 is a block diagram illustrating an architectural design system that assists an architect in designing a building feature in accordance with the present invention.

Reference will now be made in detail to the present preferred embodiment of the invention, an example of which is illustrated in the accompanying drawings in which like reference characters refer to corresponding elements.

FIG. 1 is a block diagram illustrating the major components of the architectural design system of the present invention. Processor 100 includes retrieving tools 120 that retrieve information from resource storage subsystem 200, search terms storage subsystem 300, and custom storage subsystem 800 as requested by the user through user interface subsystem 500 and cause the information to be displayed on a display subsystem 400.

The processor 100 can be implemented using a suitably programmed general purpose computer. In general, any device or assembly of devices capable of implementing the flowcharts in FIGS. 7 and 8A–8D can be used as the processor. As shown in FIG. 1, the processor 100 includes processing tools 130, retrieving tools 120 and navigation tools 110.

User interface subsystem 500 is provided for interaction with the display mechanism 400. The user interface subsystem 500 may comprise a mouse, keyboard, touch screen, or any other suitable mechanism for accessing the options provided.

Resource storage subsystem 200, search term storage means 300, and custom storage subsystem 800 may include any suitable memory hardware for storing the necessary information. Such devices include but should not be limited to RAM, ROM, or auxiliary storage means such as CD-ROM, or a magnetic diskette or tape. As further illustrated in FIG. 2A, the resource storage subsystem 200 includes multiple sections such as building code resource section 210, accessibility resource section 220, directories section 230, and formats section 240.

FIGS. 3A through 3H further illustrate the details of each of the aforementioned sections in the resource storage subsystem 200. Building code resources section 210 includes the BOCA® National Building Code, 1993 and 1996 (copyright of Building Officials and Code Administrators International, Inc.) (hereinafter referred to as "BOCA"). BOCA resource 211 allows the user to view the text of the BOCA international building code. If a user were to access the BOCA resource 211 without first selecting a search term, the table of contents of the text of the BOCA code would be displayed. The text of each listed section of the table of contents is preferably contained in its own document. Once a user is in a single document, the user can navigate through the document using a plurality of provided navigation features which are further described below with reference to FIG. 5. Other building code resources may be provided such as a Uniform Building Code (hereinafter referred to as "UBC") section UBC 212, a Standard Building Code (hereinafter referred to as "SBC") section SBC 213, a National Fire Protection Association Life Safety Code®, 1994, (hereinafter referred to as "NFPA") NFPA 214, a state regulations section 215, and a local regulations section 216.

As shown in FIG. 3B, the resource storage means 200 also includes an accessibility resource section 220 equipped with the Americans with Disabilities Act (hereinafter referred to as "ADA") accessibility guidelines 221, the fair housing accessibility guidelines 222, the American National Standards Institute guidelines 223 and Uniform Federal Accessibility Standards (hereinafter referred to as "UFAS") 224.

Resource storage subsystem 200 also may include directories section 230, as shown in FIG. 3C. Directories section 230 preferably includes the fire resistance directory 231 published by Underwriter Laboratories, Inc. Directories section 230 may also include sound section 232.

Figure 3E:
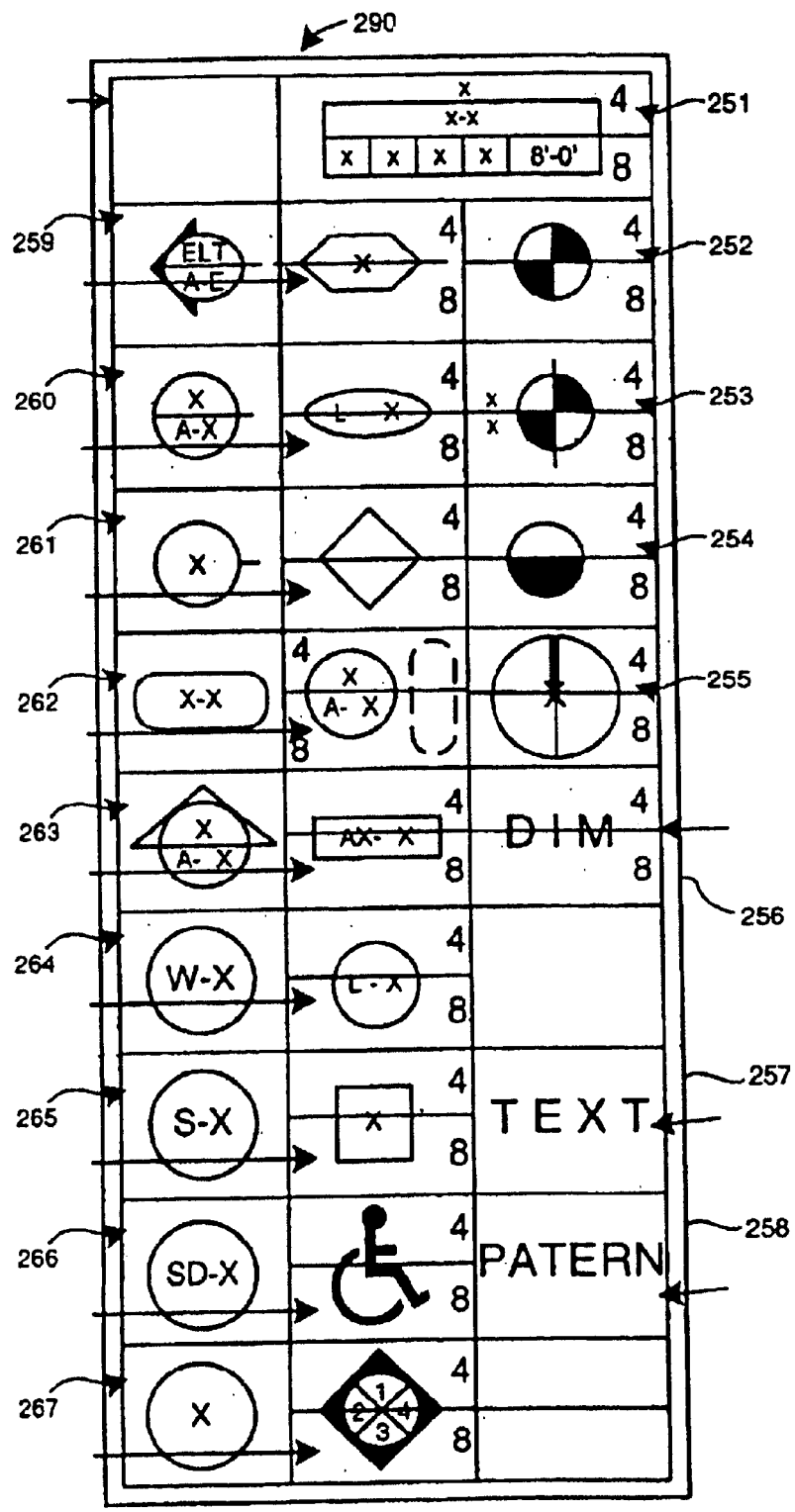
FIG. 3E is a diagram showing components of the graphic symbol resources section.

Graphic symbols resource section 250 includes the main graphic symbol menu 290 shown in FIG. 3E. The menu shows various submenus including building sections submenu 259, detail target submenu 260, and door submenu 262. The symbols provided are Autocad form symbols that can be easily inserted in drawings through the use of the invention. Other sysmbols shown include room finish symbol 251, datum point 252, datum elevation 253, match line 254, North symbol 255, dimension layer pen and color set 256, test layer pen and color set 257, pattern menu button 258, exterior elevation 263, window type 264, stove vent 265, sliding door 266, and column grid bubble 267.

Figure 3F:
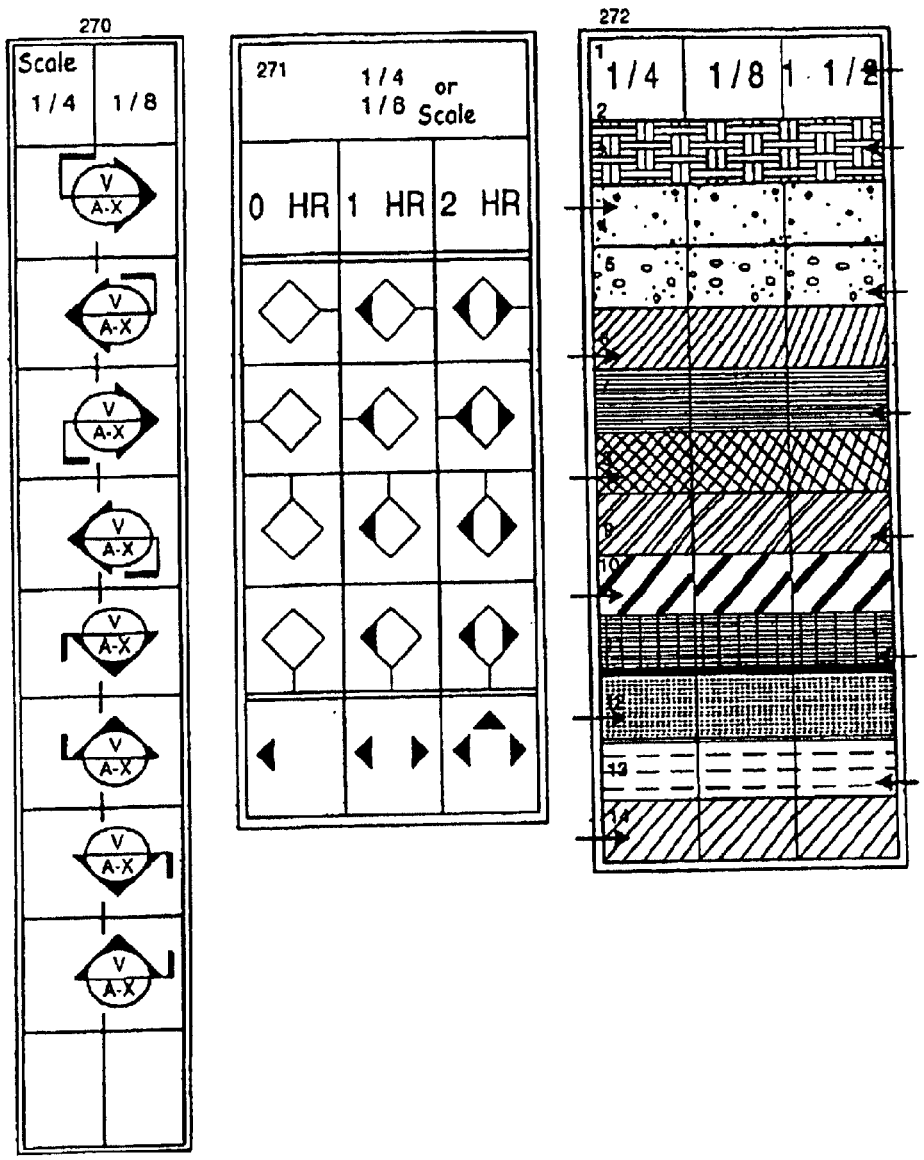
FIG. 3F illustrates further components of the graphic symbol resources section.

FIG. 3F provides an illustration of building section submenu 270, wall type submenu 271, and pattern submenu 272, all of which may be included in graphic symbols resource section 250. Building section submenu 270 provides a symbol for each direction and scale. Wall types submenu 271 provides wall types for each direction and scale. Pattern menu 272 provides different scale patterns for different materials or construction drawings.

FIG. 3G provides a wall symbol 280 that can be created with the resources of the invention. Wall symbol 280 includes a first letter 281 that stands for the wall material. In the instance shown, "S" stands for steel strut. Symbol 282 provides the insulation type which in this instance is sound insulation. Reference numeral 284 provides a specific variation number. Finally, corner shading 283 provides the fire rating. The wall type symbol helps a contractor to follow information from the plans or sections without looking to the wall type schedule.

Figure 3H:
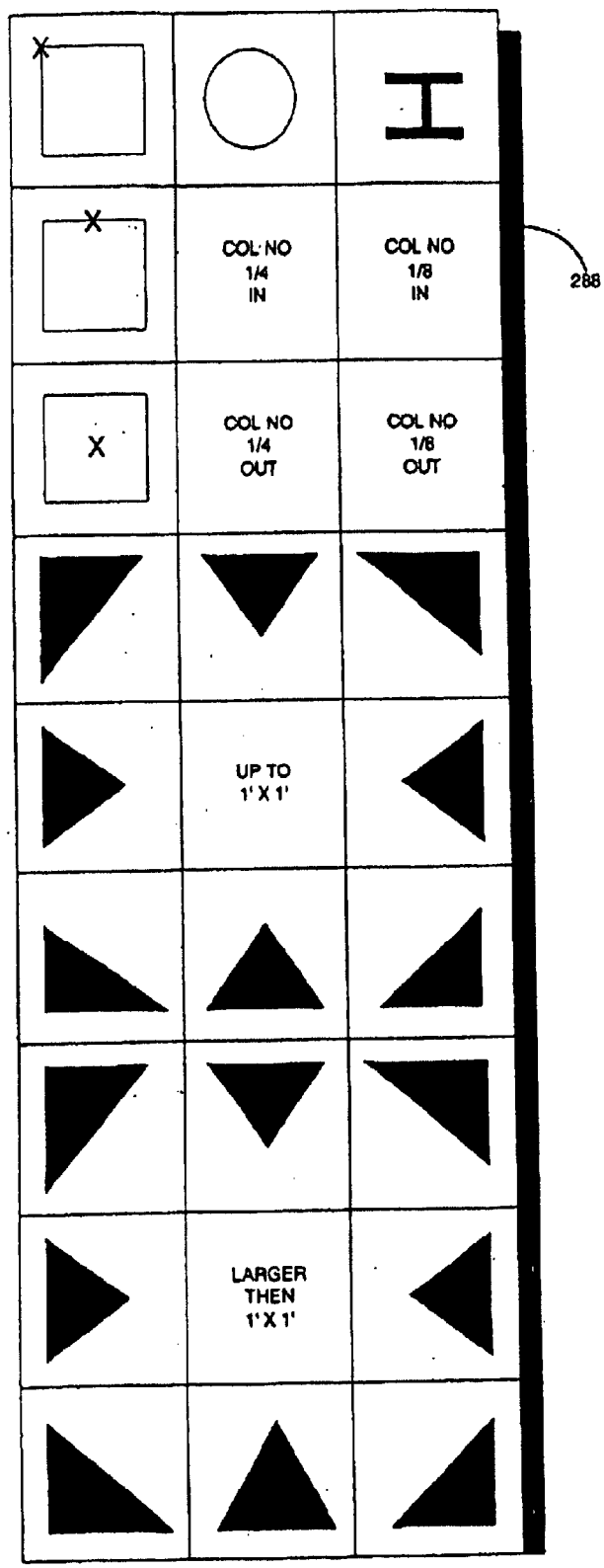
FIG. 3H illustrates further graphic symbol resources.

FIG. 3H shows a column drawing menu 288. The symbols on the menu can be used to provide any size column with the shading in it. The user can also select symbols from the menu and place them on the column.

Resource storage subsystem 200 further may include formats section 240. Preferably, this section includes The Construction Specifications Institute Master Format (hereinafter referred to as "CSI") 241 that allows the user to list the 16 CSI master format divisions.

So that a user may efficiently access the applicable portions of the desired resources, search term storage subsystem 300 is provided to enable the user to search for information regarding indexed topics. As shown in FIG. 2B, search term storage subsystem 300 preferably includes physical environmental features section 310, assembled building components section 330, and building elements section 350.

Physical environmental features section 310 is shown in detail in FIG. 4A. The terms shown, including building 311, interior 312, circulation/parking 313, common 314, units 315, kitchen 316, bath 317, storage 318, utility 319, and exterior 320 are typical physical environmental attributes for which a user would require building code resources and accessibility resources.

In the physical environmental features section 310, the building search term 311 leads to global building information such as building use groups, construction classifications, building height, and building area. Interior search term 312 leads to information dealing with the interior environment such as room dimensions, required natural light, and ventilation. The circulation/parking areas search term 313 guides a user to information related to pedestrian and automobile circulation area requirements such as exit corridors, means of egress, number of parking spaces, or drive aisle requirements. The common search term 314 leads a user to information dealing with common areas in buildings such as assembly areas and party rooms. The units search term 315 leads to information related to dwelling units, hotel suites, hospital rooms, etc. Kitchen search term 316 leads to kitchen related information such as ventilation requirements, accessibility requirements, and required dimensions. Bath search term 317 leads a user to information related to bathrooms such as toilet and bathing facilities. The storage search term 318 allows a user to find information related with storage such as minimum closet area requirements. Utility search term 319 allows a user to find information related to utility areas, such as mechanical rooms, and hot water heater closets. Finally, exterior search term 320 leads a user to information related to balconies, decks, and patios, such as live load requirements and slope requirements.

FIG. 4B details features of assembled building components section 330. The section may include access to information including framing 331, wall 332, floor 333, roof 334, vertical circulation 335, window 336, door 337, mechanical 338, electrical 339, and plumbing 340. The framing search term 331 allows a user to find sections and chapters in the resources related to foundations, columns, and/or beams. The resources may list live loads requirements and seismic requirements for framing systems and other relevant guidelines. The wall search term 332 allows the user to find sections and chapters in the resources related to walls such as fire partition requirements and bearing wood frame construction. Floor search term 333 allows the user to find information in the resources related to floors such as area requirements, loads, and surfaces. The roof search term 334 allows the user to find sections and chapters in the resources dealing with roofs such as wind loads and fire resistance requirements. The vertical circulation search term 335 allows the user to find portions in the resources related to stairs and ramps such as means of egress, treads and risers, and handrails. Window search term 336 allows a user to find portions in the resources related to windows such as required glass, ventilation areas, and dormers. The door search term 337 allows a user to find portions in the resources relating to doors such as rated fire door assemblies and maneuvering clearances at doors. The mechanical search term 338 allows a user to find portions in the resources dealing with mechanical systems such as ventilation, heating systems and dampers. Electrical search term 339 allows a user to find portions in the resources dealing with electrical systems such as lighting and emergency electrical systems. Finally, the plumbing search term 340 allows a user to find portions in the resources dealing with plumbing systems such as sewer and water supply systems.

Building elements section 350 is divided into 16 divisions that correspond to the Construction Specification Institute's master format 16 division numbering systems. Division one includes general requirements such as price and payment procedures and product requirements. Division two accesses information related to site construction such as earth work and utility services. Division three accesses information related to concrete such as cast in place concrete and precast concrete. Division four accesses information related to masonry such as brick, chases and hollow units. Division five accesses information related to metal, such as price and payment procedures and product requirements. Division six accesses information about wood and plastic. Division seven accesses information related to thermal and moisture protection such as flashing and sheet metal and roofing systems. Division eight allows a user to access information related to doors and windows such as means of egress stores, skylights and glazing. Division nine allows a user to access information regarding finishes, such as wall finishes, paint, and tile. Division ten allows a user to access information related to specialties such as chalkboards, lockers and toilet accessories. Division eleven allows a user to access information related to equipment, such as window cleaning systems and waste equipment. Division twelve leads a user to information regarding furnishings such as furniture and window treatments. Division thirteen can help a user to access information regarding special construction, such as acoustical wall treatment, swimming pools, and security systems. Division fourteen leads to information related to conveying systems, such as elevators, lifts, and cranes. Division fifteen helps a user to access information related to mechanical systems such as heating and cooling systems, plumbing systems, and ventilation systems. Finally, division sixteen accesses electrical systems such as transmission and distribution, communications and lighting.

Custom storage subsystem 800 can also be used in conjunction with search term storage subsystem 300. Custom storage subsystem 800 is configured to assist a user in selecting a particular building item. For this purpose, as shown in FIG. 2C, custom storage subsystem 800 includes category storage 810, subcategory storage 820, criteria storage 830, and item storage 840. These sections are linked to one another such that the selection of a category will extract specific subcategories, the selection of a subcategory will extract particular criteria, and the selection of particular criteria will extract items meeting the criteria.

Figure 5:
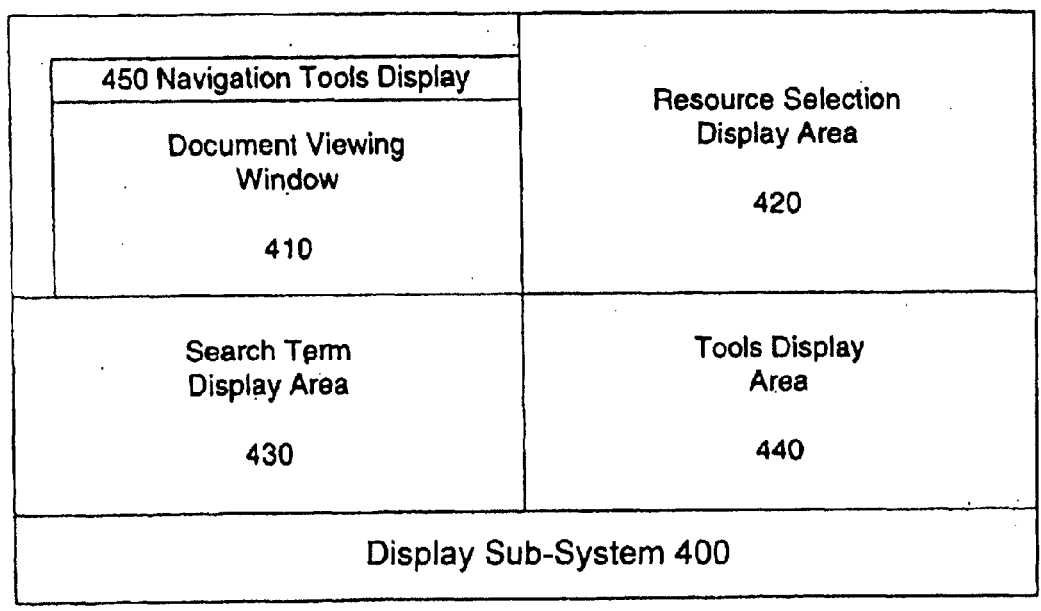
FIG. 5 is a block diagram illustrating the components of the display subsystem.

FIG. 5 illustrates the components of display subsystem 400. Search term display area 430 displays the aforementioned options included in the physical environmental features section 310, assembled building components section 330, and building elements section 350. Resource selection display area 420 displays the options enumerated for resource storage subsystem 200 including the building codes resource section 210, accessibility resource section 220, directories section 230, formats section 240, and graphic resource storage section 250. A document viewing window 410 displays the data located by the processer 100 in response to a user inquiry. A tools display area 440 displays some additional available tools. Such tools may include a help button for generating online help information, an about button for generating information about the software, and a clear button for deselecting all of the selected buttons. Additionally, an exit button may be provided for exiting the program. A navigation tools display 450 includes an area showing tools available for navigation between documents. Such tools preferably include a mechanism for moving forward and a mechanism for moving backward.

Generally, in operation, a user will make an inquiry concerning the design of a specific feature. The user will select this feature from the search term display area 430. Alternatively, the user can enter the term as a key word if it is not available in the search term display area 430. Upon selection, processor 100 will access the search term storage subsystem 300. Using processing tools 130, processor 100 will disable any resources in the resource storage subsystem 200 that do not contain information regarding the selected search term. This becomes apparent to the user because the resource selection display means 420 will show the term as disabled. The user is then able to select from the enabled resources. Upon selection, a document with hypertext win appear in document viewing window 410. When the user sees the desired hypertext, the user can select the hypertext to view the referenced document. Upon accessing a document, the user can navigate between documents if other documents have previously been downloaded. Otherwise, the user can select different hypertext, select alternative resources, or enter a new search inquiry. If the user has located all the information desired, the user can then exit the program.

Figure 6A:
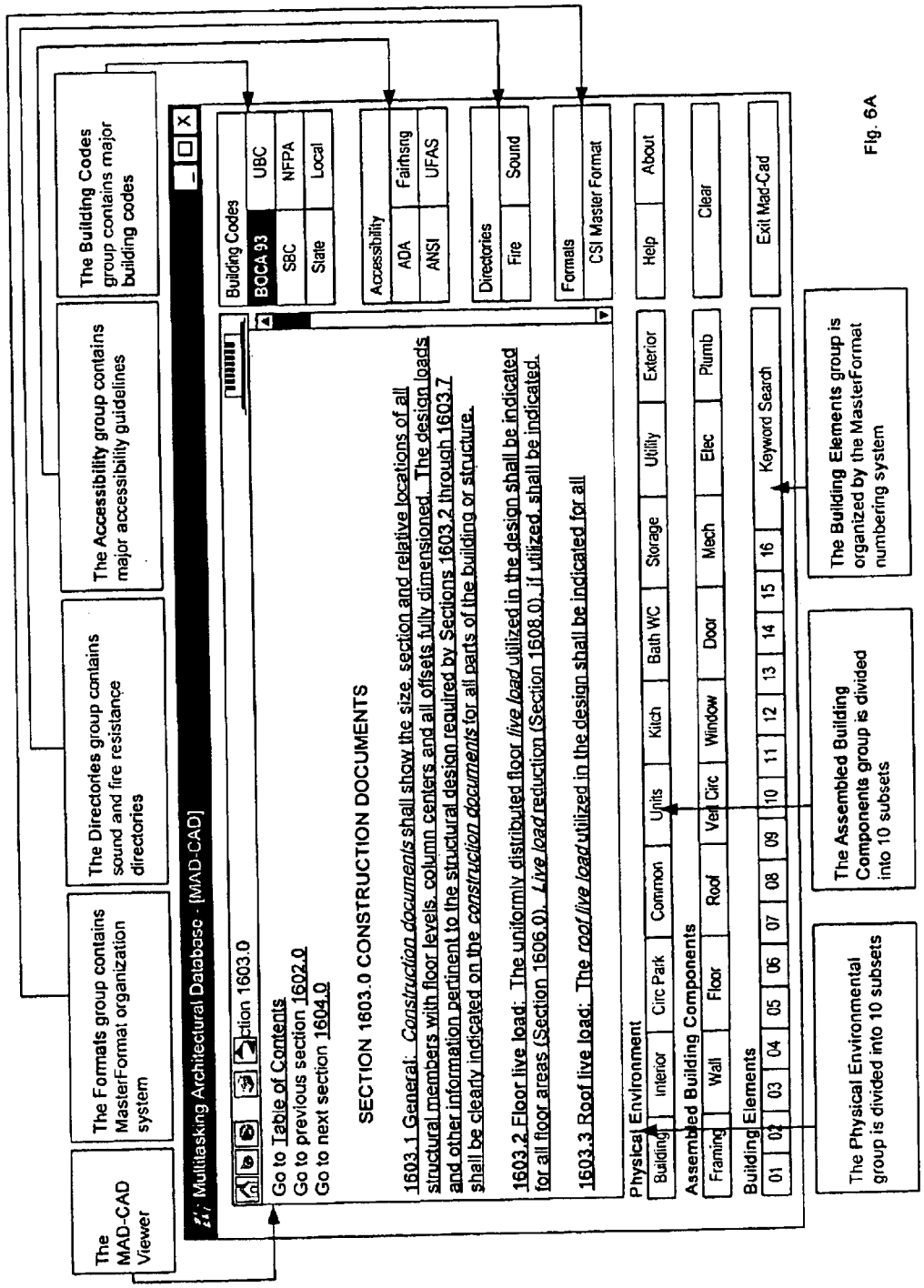
FIG. 6A is an example of a screen display of the system awaiting user input.

FIG. 6A illustrates a preferred layout for the screen display. The screen display shown displays text from a selected resource.

Figure 6B:
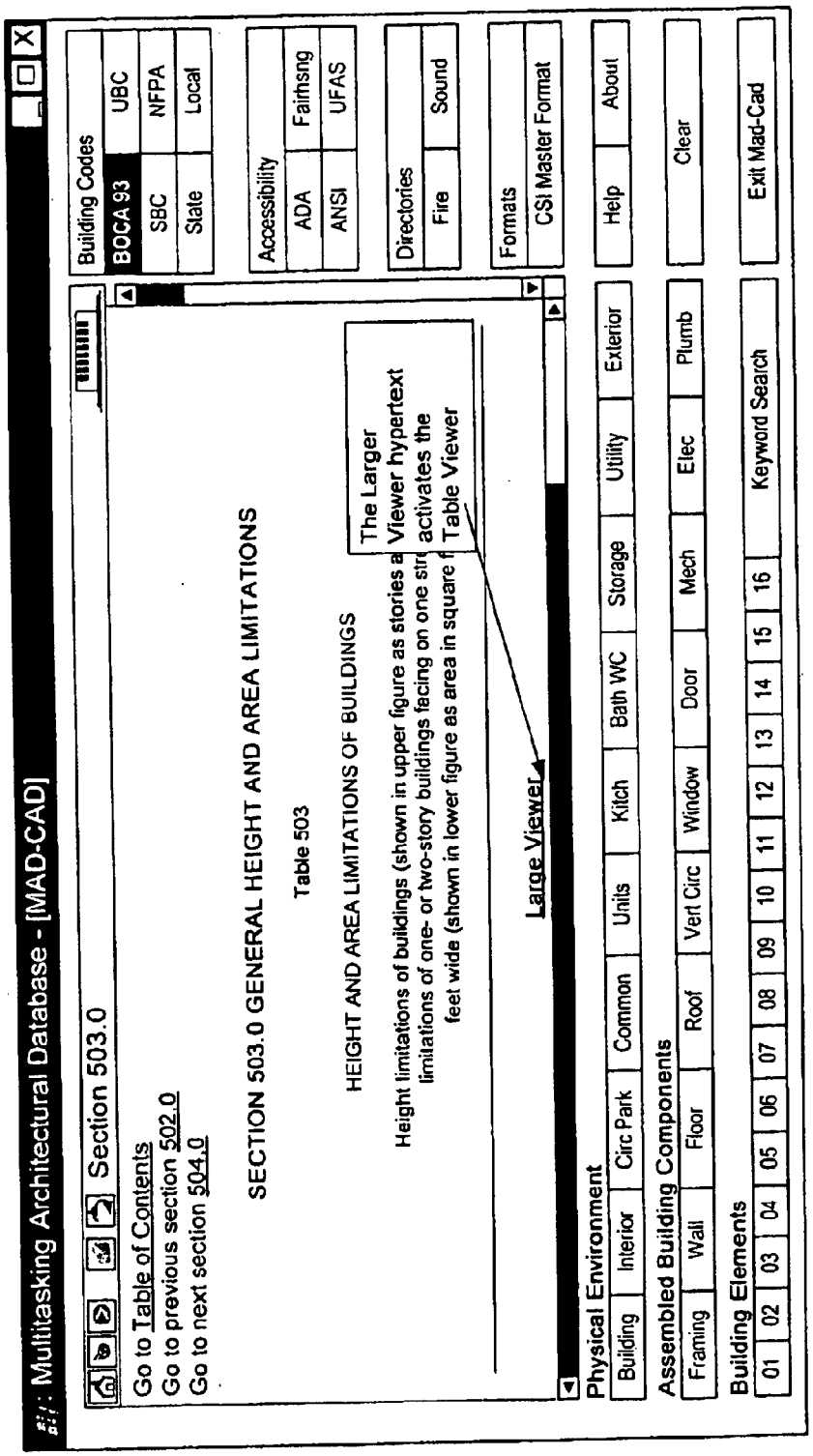
FIG. 6B is an example of the screen display in a selected viewing mode.

FIG. 6B illustrates a table viewing option that is preferably provided. When a resource includes a table, hypertext will be provided to activate the table viewing option. With the table viewer, tables of large size can be efficiently used. Scroll bars are preferably provided.

Figure 6C:
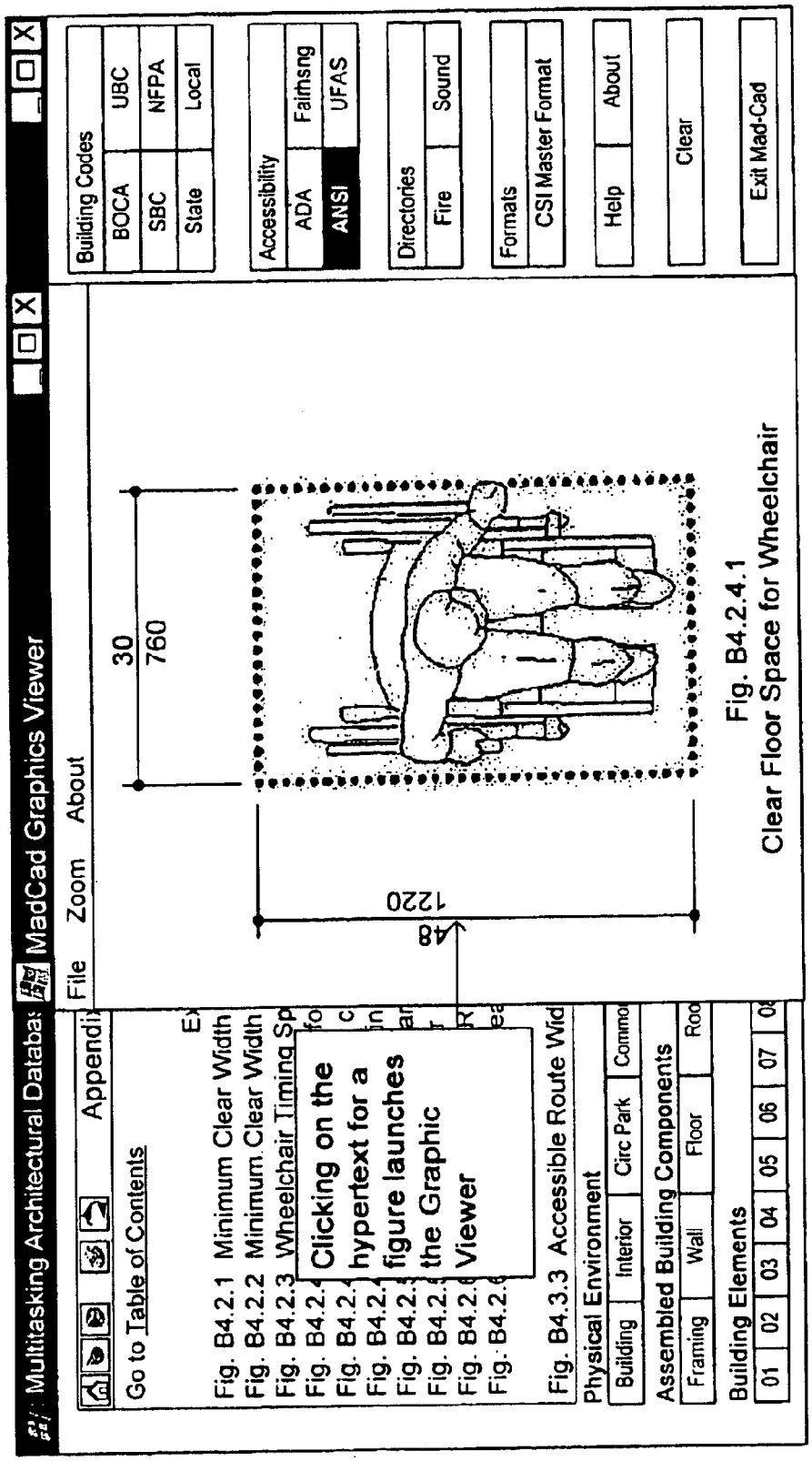
FIG. 6C is an example of the screen display in an alternative selected viewing mode.

FIG. 6C illustrates an image viewing option that is preferably provided. The image viewing feature allows the user to display an image with various magnification factors. The magnification of the image can be varied, as can the magnification of small portions of the image.

Figure 7A:
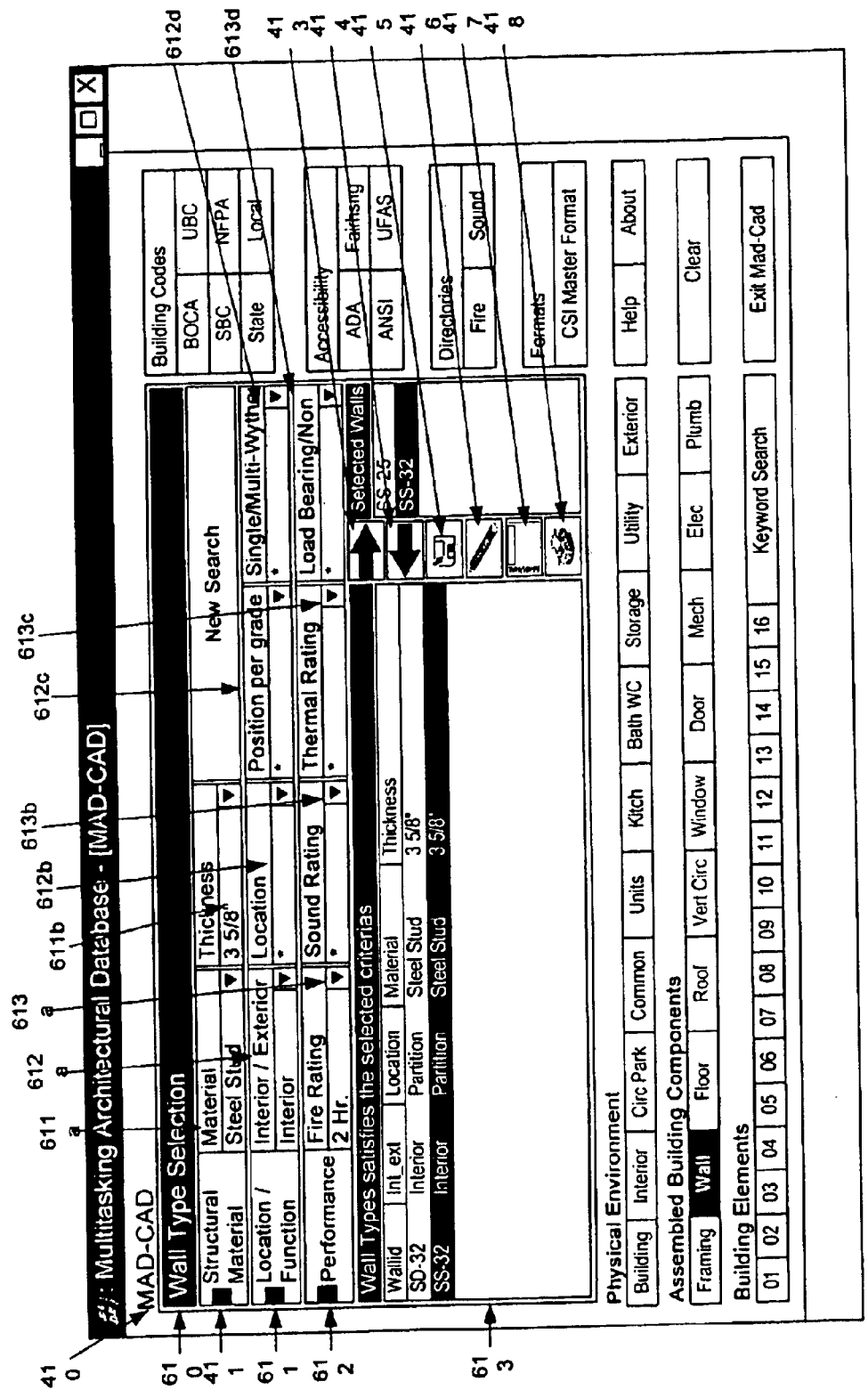

FIG. 7A illustrates the customized search mode of locating information regarding a search term in assembled building components section 330. The user will preferably be provided with the option of performing either a customized search or a resource search as described above. In the example shown, wall 332 has been selected as the search term. In document viewing window 410, wall type selection criteria 610 are displayed. The user can either select an enabled resource as described above or can select specifications from wall type selection criteria 610. In the example shown, the user can select a subcategory from structural materials category 611, from location/function category 612 or from performance category 613. Within each subcategory the user can select desired criteria.

When criteria are selected, the bottom half of document viewing window 410 will automatically narrow down to the list 411 of particular items that satisfy the selected criteria. In tool box 412, the items are listed and navigation buttons are provided for manipulating the items. Navigation button 413 is a right arrow that allows the addition of items to the list. Left arrow 414 allows the deletion of items from the list. Save button 415 allows the list to be saved to a disk. Erase button 416 erases all selections from the list. Report button 417 creates an 8½×11 inch detailed report for the items and print button 418 allows the items to be printed.

Figure 7D:
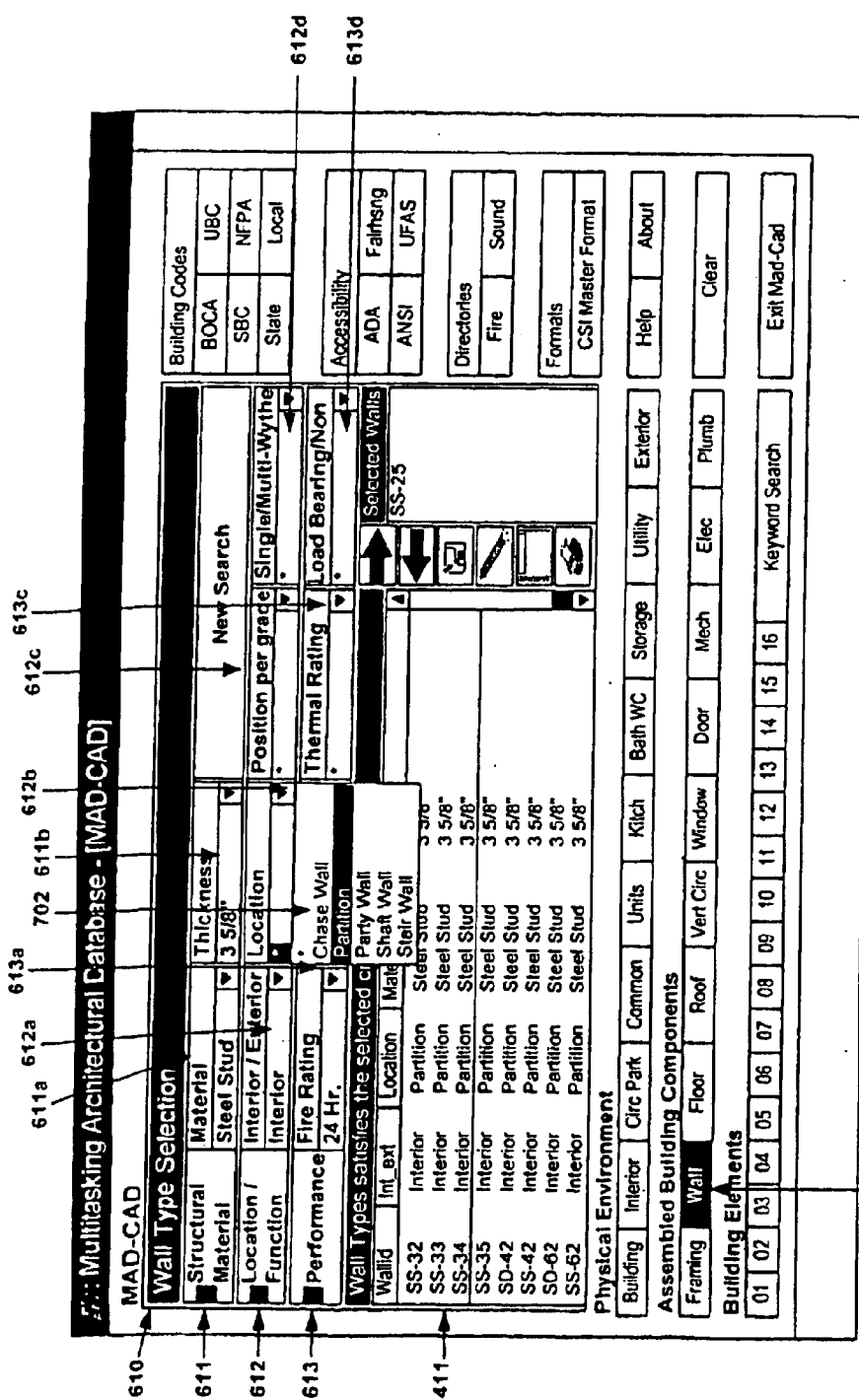
Figure 7E:
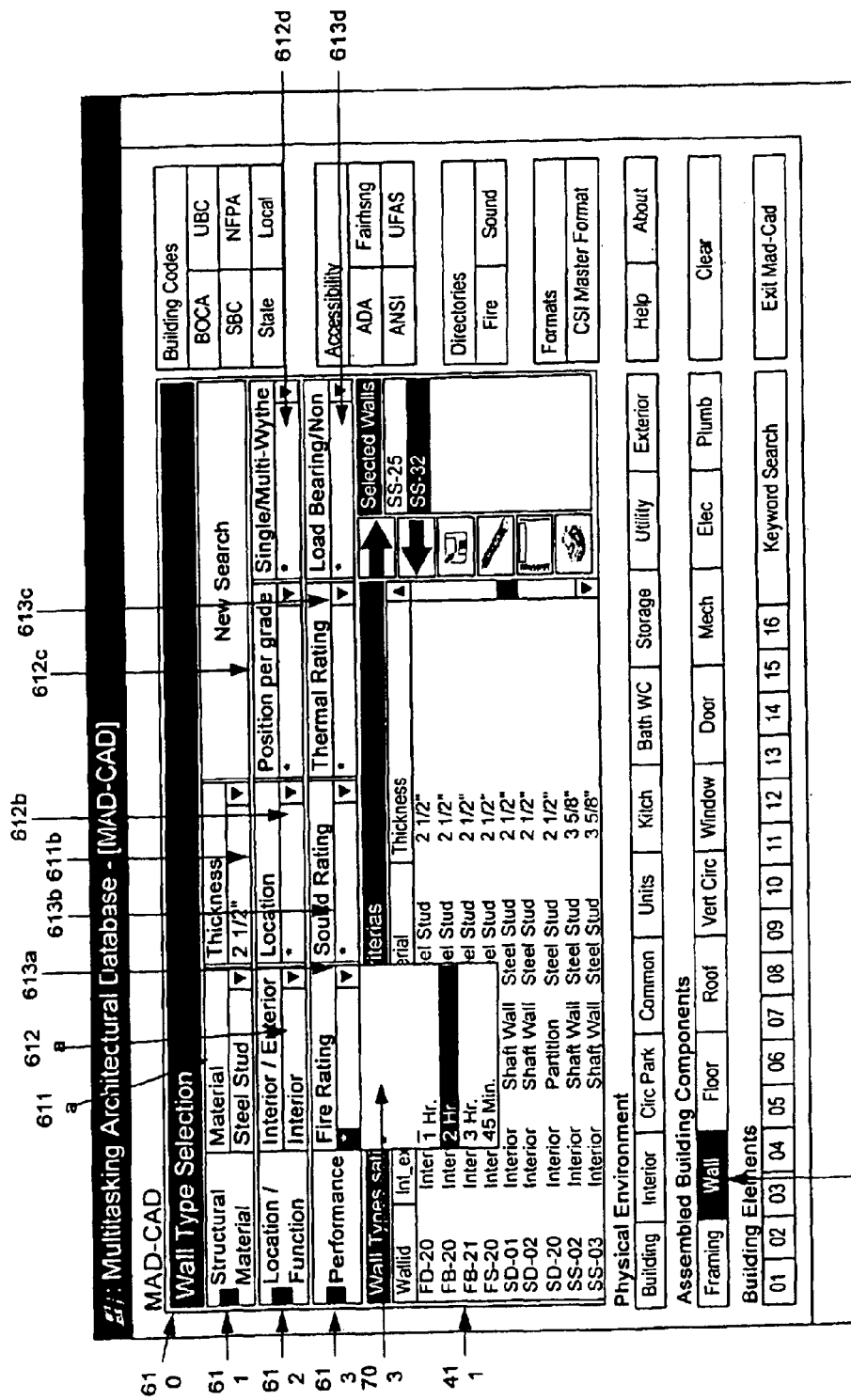
Figure 7F:
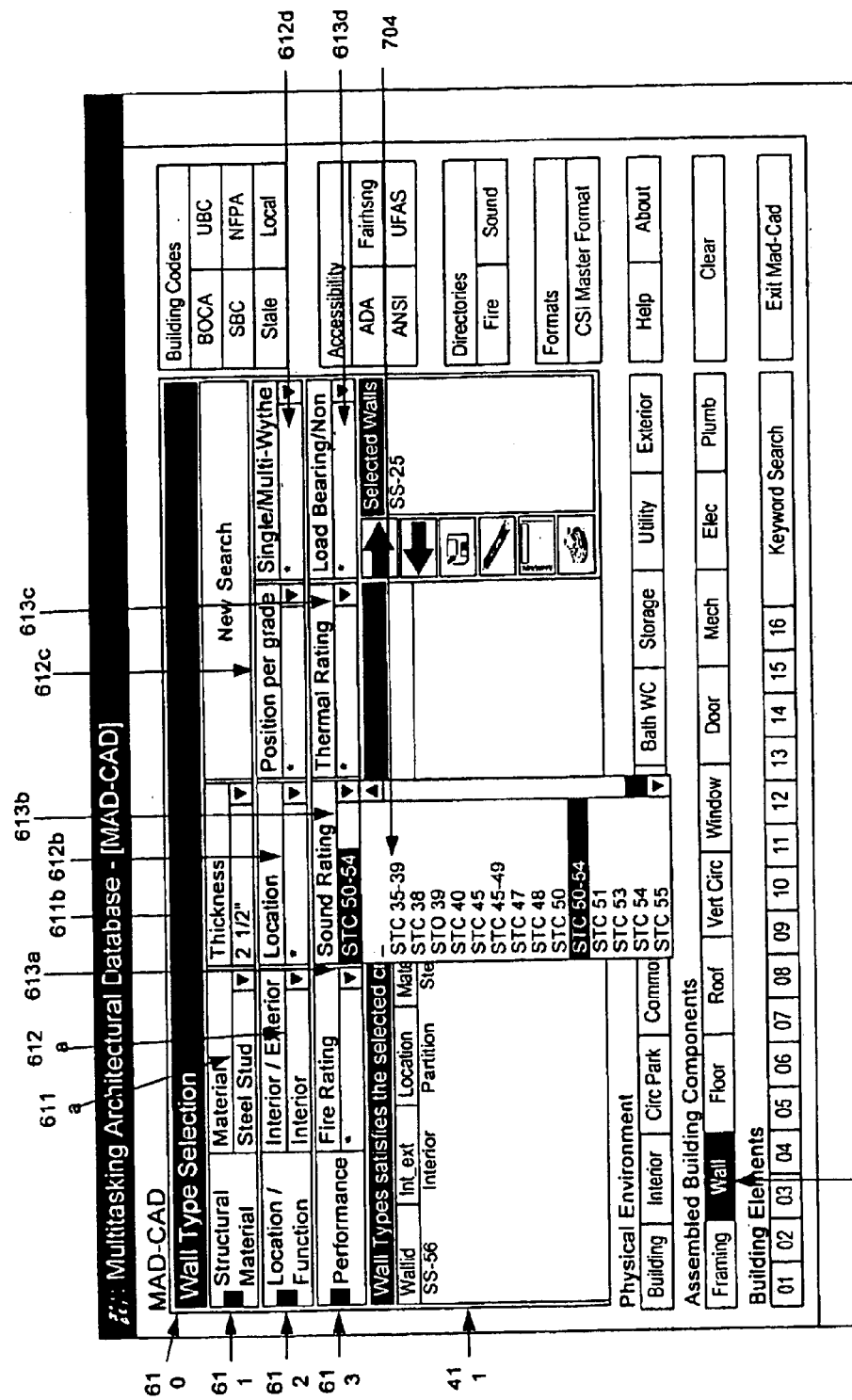

As shown in FIG. 7B, when presented with wall type selection criteria 610, the user can select a subcategory within a category. In this instance, under the structural material category 611, the user has selected subcategory 611a which presents a pull-down menu 700 of specific materials. Here, "steel stud" has been selected and the list 411 is formed to include all walls that are formed from steel stud material. The user can then proceed to thickness subcategory 611b. When a specific thickness is selected, those entries not having such a thickness will be eliminated from the list in bottom half 411. Progressively, by selecting specific criteria from each subcategory, the user can have entries deleted automatically to create a manageable list. FIG. 7C further illustrates the process of narrowing the list based on the thickness 611b of the wall. Pull down menu 701 is provided which includes specific thicknesses from which a user can select. Once a particular thickness is selected, the list available of items in section 411 is again narrowed. FIG. 7D shows the selection of location subcategory 612b. A specific location can be selected from pull down menu 702 and the list 411 is further narrowed. FIG. 7E displays the criteria 703 under the fire rating subcategory 613a. FIG. 7F illustrates the criteria 704 under sound rating subcategory 613b.

Figure 7G:
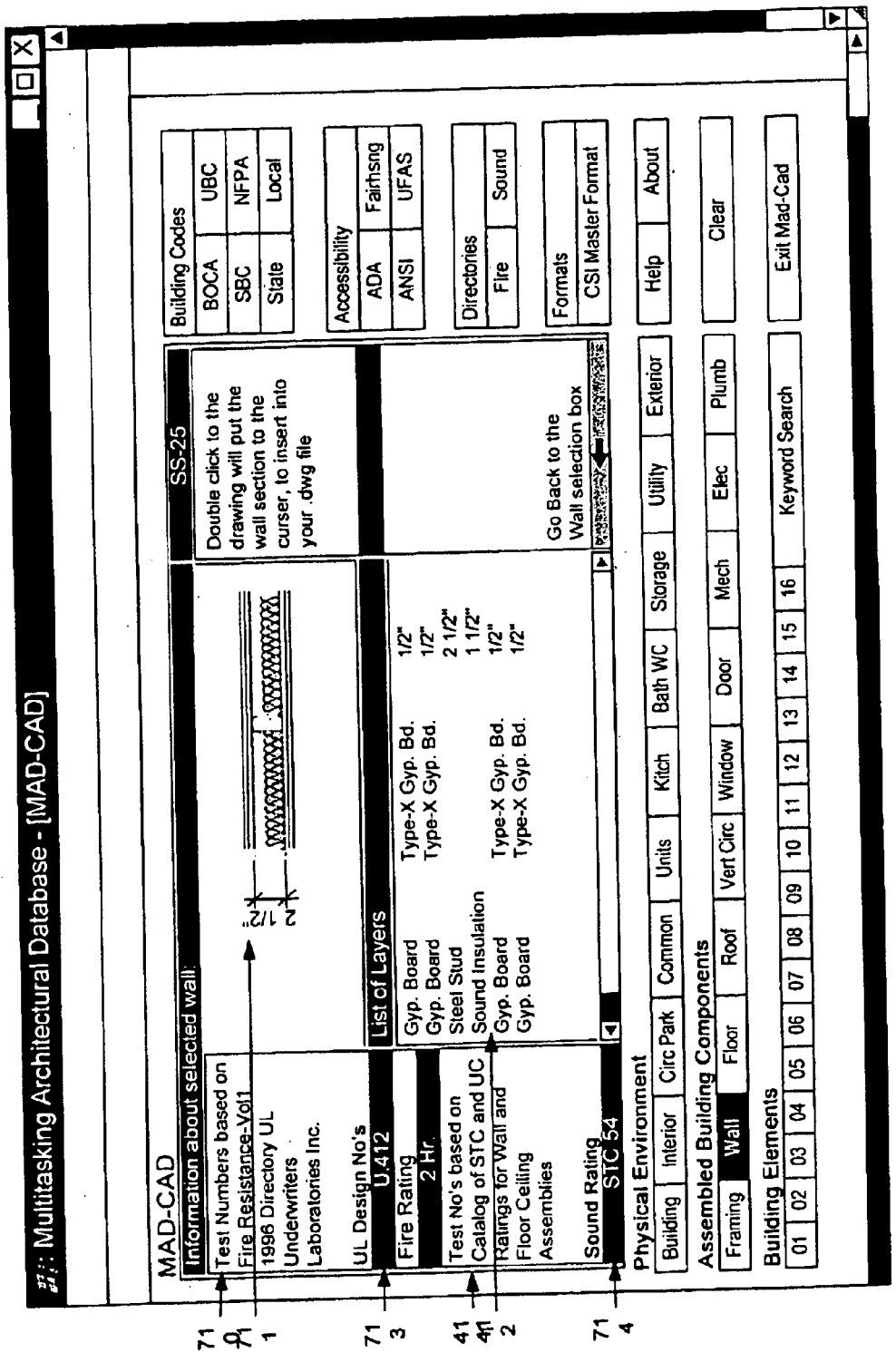
Figure 7H:
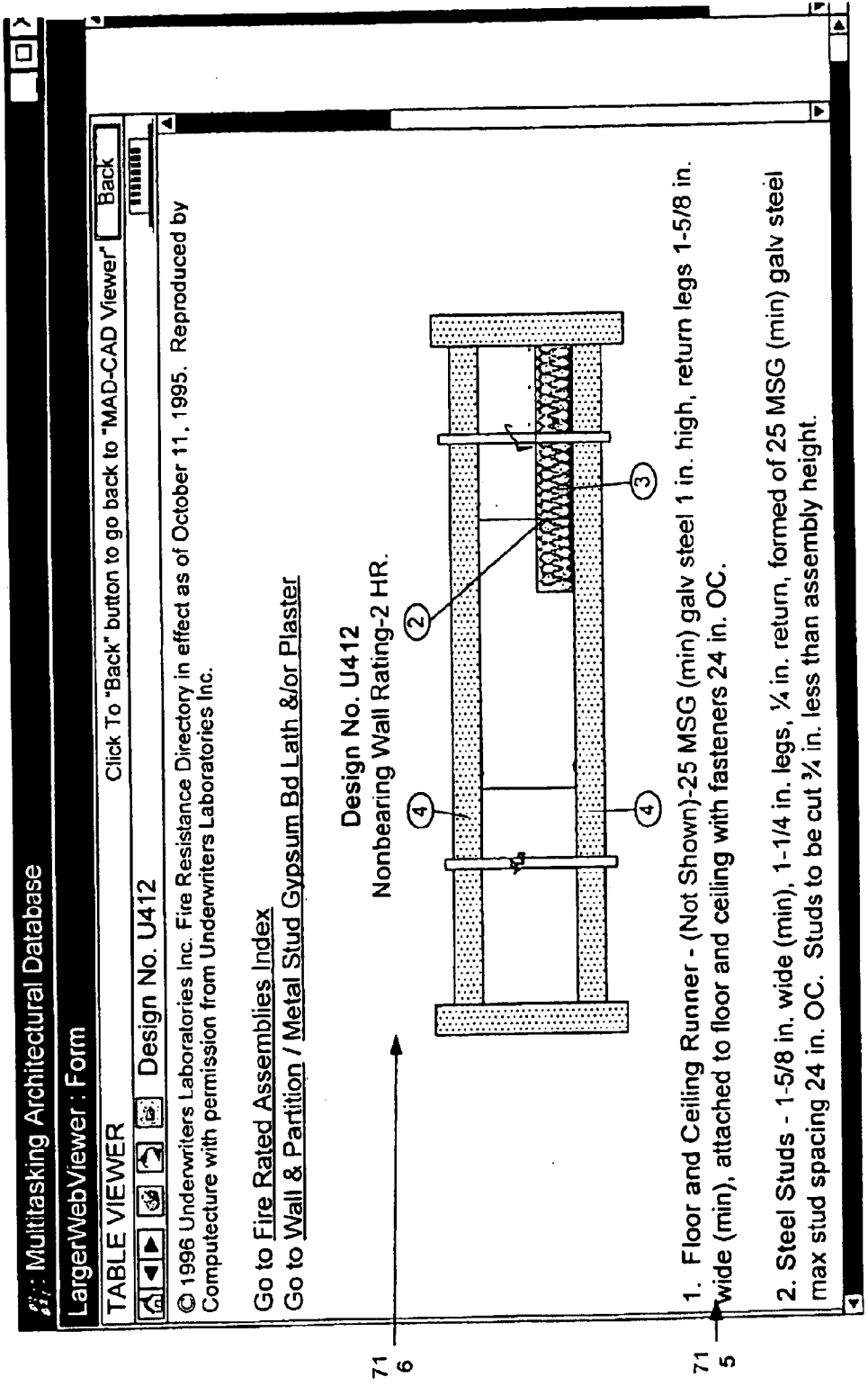

After the list 411 of possible selections has been narrowed through the process of selecting criteria from each subcategory as described above, the user can select one particular item. To display more information about the selected item, the user can double click on the item and as shown in FIG. 7G, and can view an information dialog box 710 for that item. Box 710 includes a plan diagram 711 of the selected item and written information 712. In this example, the written information includes a list of wall layers. Box 710 also includes UL design number button 713 and STC number button 714. When either button 713 or 714 is activated, the test information 714 for the selected item appears on the screen as shown in FIG. 7H. Additionally, if a user double clicks on diagram 711, the diagram is reformatted to insert an autocad drawing 716, as shown in FIG. 7H.

Figure 8A:
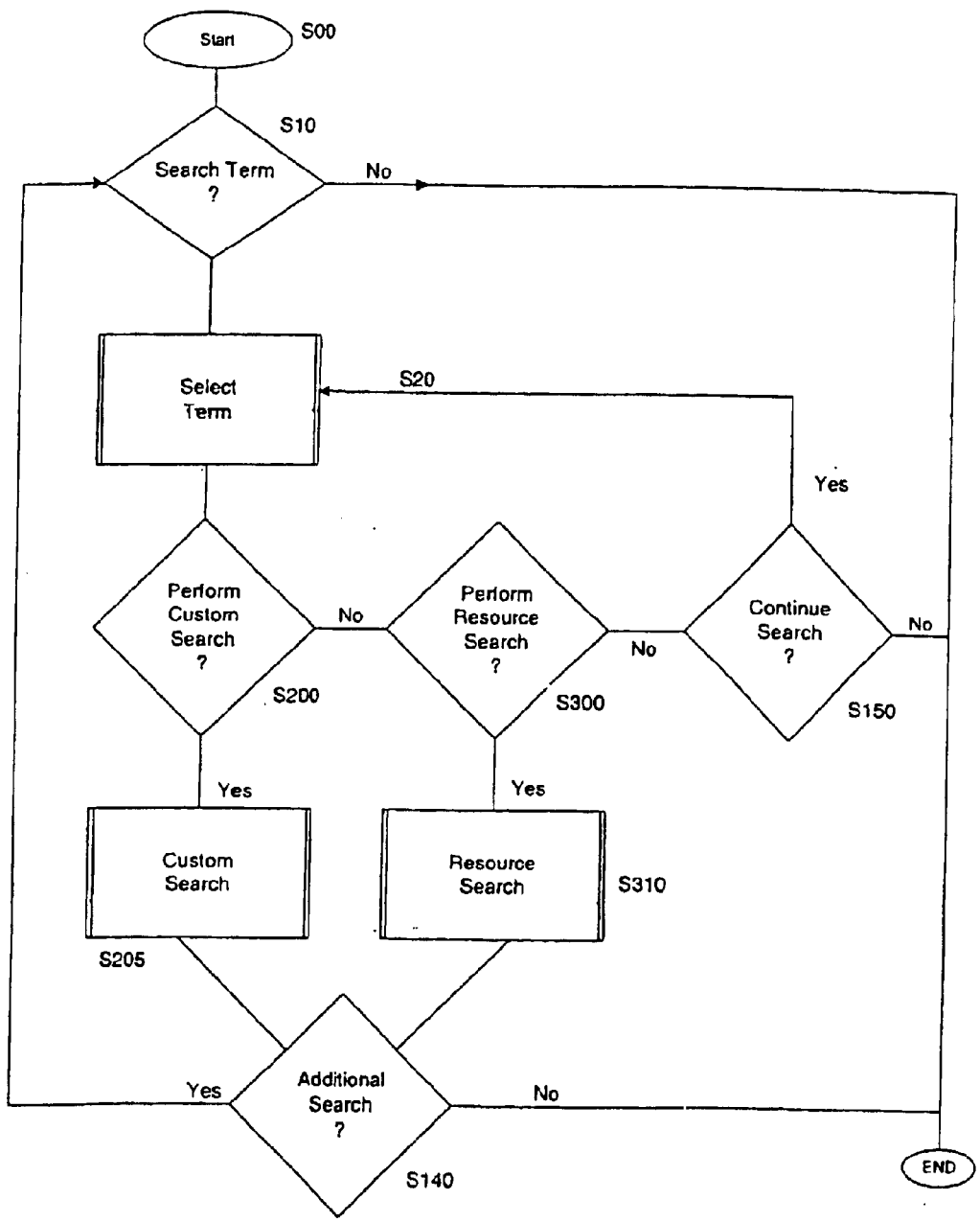
FIG. 8A is a flowchart showing the steps in the method of the invention.

FIG. 8A illustrates the steps that a user follows when searching for information. The process begins at step S00.

The user decides whether to search a term in step S10. If the user decides to search a term, the user selects the term in step S20. The user selects the term from the options in the search term display area which include those previously described in the physical environment section 310, assembled building components section 330, and building elements section 350.

Figure 9A:
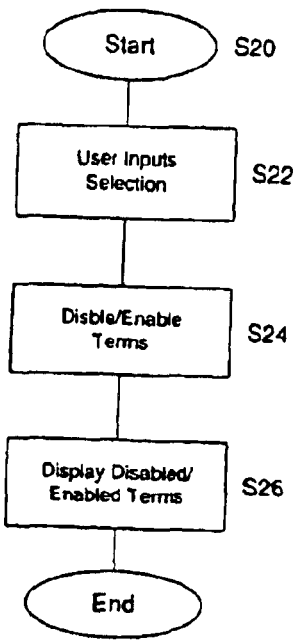
FIG. 9A is a flowchart showing the substeps in the search term selection step shown in FIG. 8A.

The procedures performed by the system in step S20 are further described in FIG. 9A. The user inputs the selection in substep S22. Upon selection in substep S24, processing tools 130 determine whether any of the resource options in storage subsystem 200 contain information about the selected term. If the resources do not contain information regarding the selected term, the resources are shown as disabled on display subsystem 400 in substep S26.

To obtain information regarding a specified search term, the user has an option of conducting a resource search or a customized search. As shown in FIG. 8A, the user can select to perform a custom search in step S200 or a resource search in step S300. Alternatively, the user can refuse both searches and elect to continue the search in step S150 by selecting another search term in step S10 or terminating the inquiry. Upon completion of a customized search in step S205 or a resource search in step S310, the user can select to perform an additional search in step S140 or terminate the inquiry.

Figure 8B:
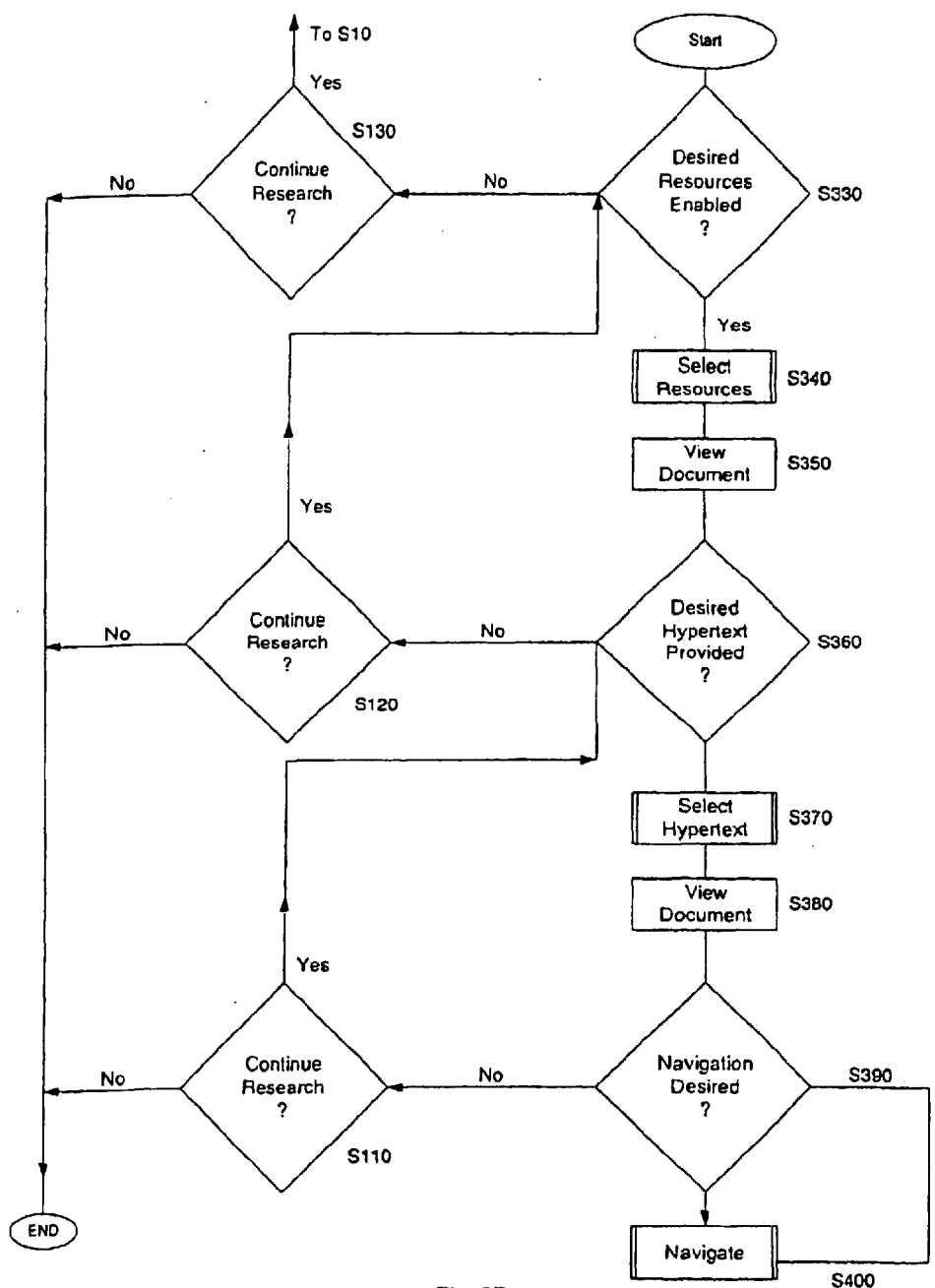
FIG. 8B is a flowchart showing the steps in the resource search method.

If the user decides to perform a resource search in step S310, the method depicted in FIG. 8B will be implemented. In step S330, the user determines whether the desired resources are enabled. If the desired resources are not enabled, the user can go to step S130 and either quit or return to step S110 to search for a new term. However, if the desired resources are enabled, the user selects the appropriate resource in step S340.

Figure 9B:
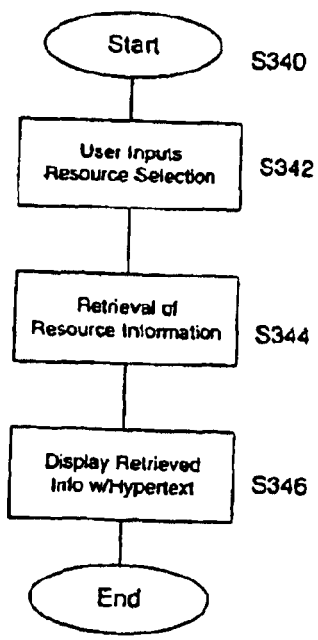
FIG. 9B is a flowchart showing the substeps in the resource selection step in the resource search method.

The procedures followed in step S340 are further detailed with reference to FIG. 9B. After user selection in substep S342, retrieving tools of processor 100 retrieve applicable information in substep S344. Document display 410 will display the appropriate information as determined by processor 100 in substep S346.

Returning to the main resource search routine of FIG. 8B, the user views the display in step S350. In step S360, the user determines if the document display contains the desired hypertext. If the desired hypertext is not provided, the user can go to step S120 and quit or select a new resource or search a new term. If the desired hypertext is provided, the user moves to S370 and selects the hypertext.

Figure 9C:
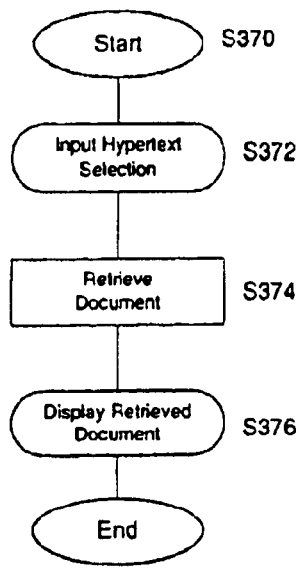
FIG. 9C is a flowchart showing the substeps in the hypertext selection step of the resource search method.

The steps followed by the system when the user selects hypertext are further described with reference to FIG. 9C. In substep S372, the user inputs the hypertext selection. Upon selection of the applicable hypertext, retrieving tools 120 retrieve the appropriate information from the storage means in substep S374 and display the information on display mechanism 400 in substep S376.

Returning to the main resource search flowchart of FIG. 8B, in step S380, the user views the displayed document. In step S390, the user determines whether navigation is desired. If only one document has been downloaded or if the user chooses not to navigate, the user moves to step S110 either to quit, select new hypertext, select new resources, or search a new term. If previous documents have been downloaded, the user can continue to navigate for as long as desired in S400.

Figure 9D:
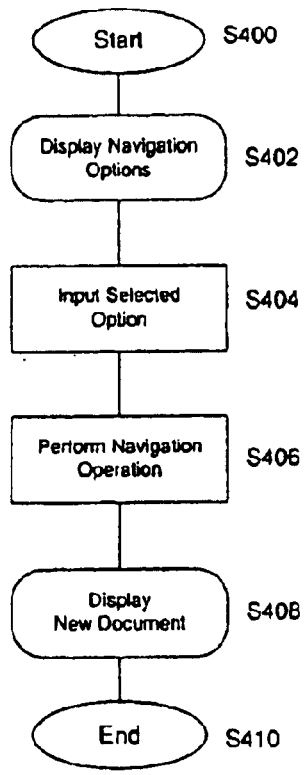
FIG. 9D is a flowchart showing additional method steps for navigation.

The navigation process is described in further detail with reference to FIG. 9D. In substep S402, the navigation options are displayed as navigation tools 450 on display mechanism 410. In substep S404 the user inputs a navigation option via user interface 500. In response to this input, navigation tools 110 of processor 100 perform the navigation operation in substep S406. In substep S408, display mechanism 400 displays the document resulting from the navigation. When the user chooses to exit, the user can quit at step S410 and exit.

Figure 8C:
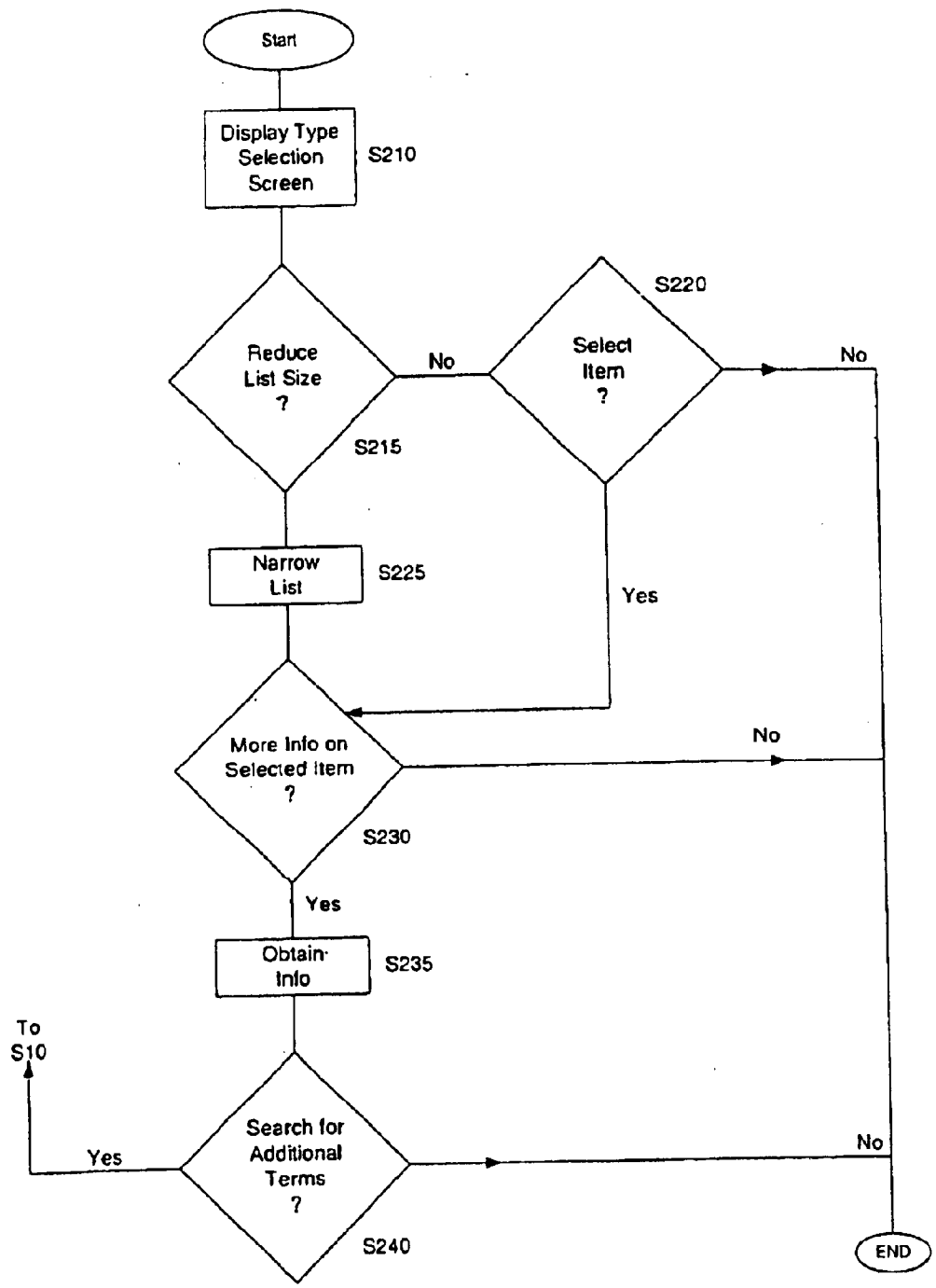
FIG. 8C is a flowchart showing the steps in the customized search method.

If the user elects to perform the customized search of step S205 in FIG. 8A, the main customized search routine depicted in FIG. 8C will be executed. The type selection screen 610 is displayed in step S210. Along with type selection screen 610, a list of available items 411 is provided as described above. In step S215, the user determines whether to reduce the list size. If the user chooses to reduce the list size, a list narrowing procedure is implemented in step S225. This procedure will result in the selection of a specific item. Alternatively, the user can select the item step S220 without narrowing the list. In step 230, the user has the option to quit or to obtain more information on the selected item. If the user seeks additional information, this procedure is performed in step S235 with the aid of retrieving tools 120. In step S240, the user can exit or return to step S10 to search additional terms.

Figure 10A:
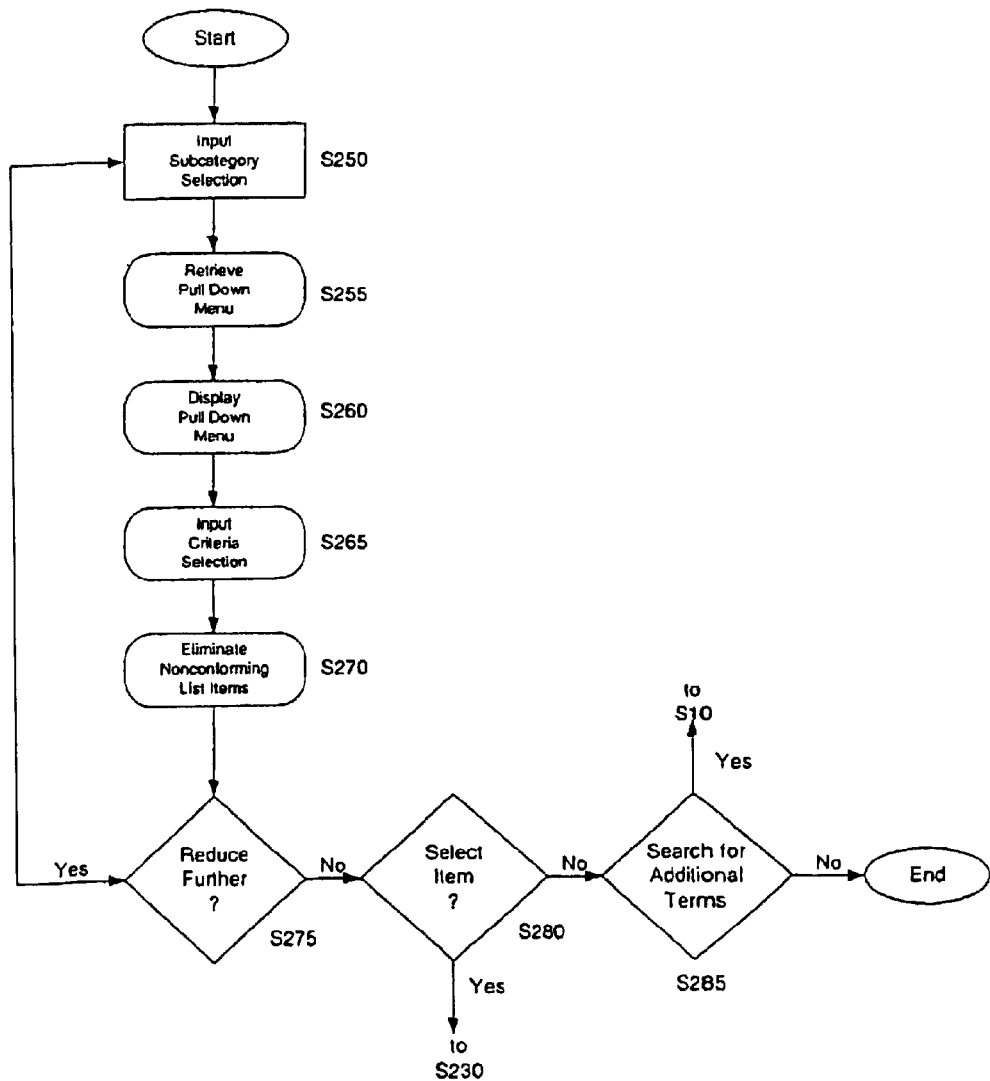
FIG. 10A is a flowchart showing the substeps in the narrowing list step of the customized search method of FIG. 8C.

FIG. 10A shows the substeps involved in the process of narrowing the list 411 of items. In substep S250, the user inputs a subcategory selection. Retrieving tools 120 retrieve a pull down menu from custom storage subsystem 800 in substep S255. The pull down menu is displayed on display mechanism 400 in substep S260. Upon viewing the menu, the user inputs selected criteria in substep S265. As a result of the selection, processing tools 130 eliminate nonconforming list items in substep S270. In substep S275, the user has the option of whether to reduce the list further by specifying additional criteria. If the user elects this option, the process returns to substep S250 so that the user can make a subcategory selection. Alternatively, the user may believe the list has been narrowed sufficiently and may choose to select a specific item on the list in substep S280. If such a selection is made, the process returns to step S230 in the main customized search routine of FIG. 8C. If the user neither selects an item or narrows the list, the user can return to step S10 to search additional terms or exit the routine.

Figure 10B:
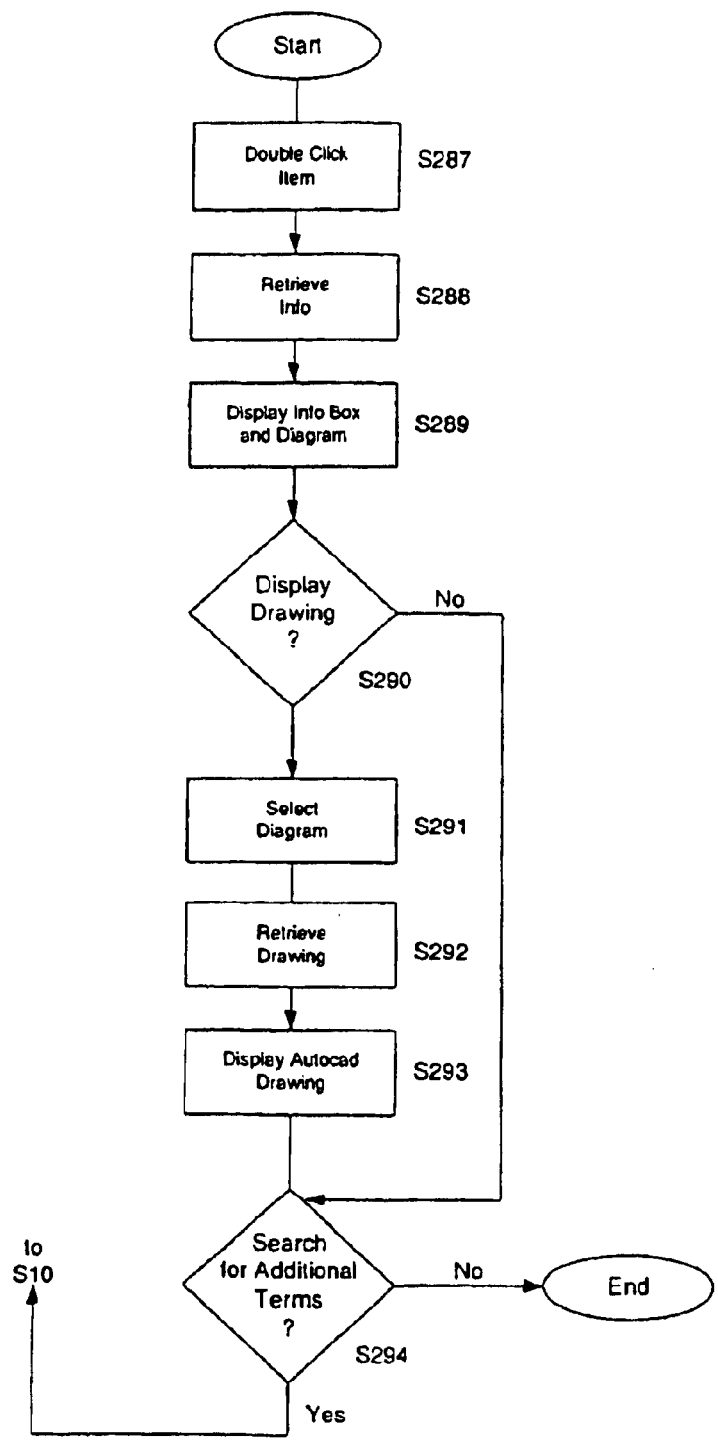
FIG. 10B is a flowchart showing the substeps in the obtaining information step of the customized search method of FIG. 8C.

FIG. 10B illustrates the process of obtaining information from step S235 in the main customized search routine of FIG. 8C. In substep S287, the user double clicks on the selected item. In response to the user input, the retrieving tools 120 retrieve the info in substep S288. In substep S289, the information is displayed on display subsystem 400. In substep S290, the user may elect to obtain additional information in the form of an AutoCAD drawing. To obtain this information, the user selects the diagram in substep S291. In response to the selection, retrieving tools 120 retrieve the AutoCAD drawing from the customized storage subsystem 800 in substep S292. The drawing is displayed on display mechanism 400 in substep S293. Subsequently, in substep S294, the user can elect to search for additional terms by returning to step S110 or the user can exit.

While this invention has been described in conjunction with specific embodiments outlined above, it is evident that many alternatives, modifications, and variations will be apparent to those skilled in the art. For example, the foregoing embodiments have been described as improvements to the Autocad computer program, but the invention is equally applicable to a Microstation computer program. Accordingly, the preferred embodiments of the invention as set forth herein are intended to be illustrative, not limiting. Various changes may be made without departing from the spirit and scope of the invention as defined in the following claims.

What is claimed is:

1. An architectural design system comprising:
   a resource storage means for storing a plurality of building references;
   a custom storage means for storing a plurality of characteristics of building features;
   a search term storage means having sections for storing a plurality of predefined search terms, the sections comprising at least one of a physical environmental features section, an assembled building components section, and a building elements section;
   a user interface means for allowing a user to select a search term from the plurality of predefined search terms stored in the search term storage means wherein upon selecting a search term, the user interface allows selection of one of a resource search and a custom search;
   a processing means for conducting the resource search and the custom search, wherein the custom search facilitates selection of a particular item from the plurality of building references, and the resource search enables retrieval of further information related to the selected search term from the plurality of building references; and
   wherein said processing means enables the selection of a particular item where substantially complete building plans are not available to the user.

2. The system of claim 1, wherein the custom storage means stores a list of items and type selection criteria, that when selected, can eliminate items from the list.

3. The system of claim 2, wherein the type selection criteria are organized in main categories, subcategories, and criteria within the subcategories.

4. An architectural design system comprising:
   a resource storage means for storing a building codes resource section, an accessibility resource section, and a format resource section;
   a search term storage means having sections for storing a plurality of predefined search terms, the sections comprising at least one of a physical environmental features section, an assembled building components section, and a building elements section;
   a display means comprising a search term display area for displaying the predefined search terms located in the search term storage means, a resource selection display area for displaying a title of at least one of the building codes resource section, the accessibility resource section, and the format resource section located in the resource storage means, and a document viewing window for displaying a section of the text of the building codes resource section, the accessibility resource section, and the format resource section located in the resource storage means.
   a user interface means for allowing a user to select a search term from the plurality of predefined search terms stored in the search term storage means and allowing the user to select a resource from the title of at least one of the building codes resource section, the accessibility resource section, and the format resource section stored in the resource storage means;
   a processing means for reviewing the at least one selected resource to find at least one section of the text of the selected resource relevant to the selected search term, wherein the section of the text of the selected resource relevant to the selected search term is displayed in the document viewing window; and
   wherein said processing means enables the selection of a particular item where substantially complete building plans are not available to the user.

5. The system of claim 4, wherein the processing means includes disabling means such that when a search term is selected, each resource having no information regarding the search term is disabled, and when a resource is selected, each search term not contained within that resource is disabled.

6. The system of claim 4, wherein the building code resources section stores building code resources comprising the BOCA International Building Code.

7. The system of claim 6, wherein the building codes resources section further comprises state and local regulations.

8. The system of claim 4, wherein the accessibility resources section stores accessibility resource comprising the ADA Accessibility Guidelines.

9. The system of claim 4, wherein the accessibility resource section stores accessibility resources comprising the Fair Housing Accessibility Guidelines.

10. The system of claim 4, wherein the resource storage means further comprises a directory resources section including at least a Fire Resistance Directory.

11. The system of claim 4, wherein the format resources section stores format resources comprising CSI MasterFormat divisions.

12. The system of claim 4, wherein the physical environmental features section stores physical environmental search terms, comprising at least one of a building search term, an interior search term, a circulation and parking area search term, a common area search term, a unit search term, a kitchen search term, a bath search term, a storage search term, a utility search term, and an exterior search term.

13. The system of claim 4, wherein the assembled building components section stores assembled building components search terms, comprising at least one of a framing search term, a wall search term, a floor search term, a roof search term, a vertical circulation search term, and a plumbing search term.

14. The system of claim 4, wherein the building elements section stores building elements comprising sixteen numbered search terms that follow the Construction Specification Institute's MasterFormat sixteen Division numbering system.

15. The system of claim 4, wherein the user interface means further comprises means for allowing the user to enter a keyword as a search term and to search the resource storage means.

16. A method for designing a building feature using a computerized system, the method comprising:
   without having access to substantially complete building plans, selecting a search term from a plurality of predefined search terms corresponding to physical environmental features, assembled building components, and building elements;
   selecting one of a resource search and a customized search;
   wherein a resource search comprises the steps of determining whether desired resources are enabled, and selecting an enabled resource if an enabled resource is available;
   wherein a custom search comprises the steps of viewing an item selection list and narrowing the item selection list by selecting a category, selecting a subcategory, and selecting specific criteria within the subcategory;
   searching one of the selected enabled resource or the selected category for the search term; and viewing a resultant document display in a document viewing window on a display mechanism.

17. A method for designing a building feature of a project using a computerized system, the method comprising:

without having access to substantially complete building plans, selecting a search term from a plurality of predefined search terms corresponding to physical environmental features, assembled building components, and building elements;

enabling a resource if said resource contains text relevant to the selected search term;

determining whether desired resources from a resource storage means are enabled, the resources comprising building codes resources, accessibility resources, and format resources;

selecting at least one enabled resource if an enabled resource is available;

viewing a resultant document display in a document viewing window on a display mechanism;

selecting a hypertext section in the document viewing window; and reviewing the resultant document in the document viewing window.

18. The method of claim 17, wherein the step of selecting a search term further comprises:

disabling and enabling resource terms in response to the selection; and displaying the resource terms on the display mechanism as disabled and enabled.

19. The method of claim 17, wherein the step of selecting an enabled resource comprises:

retrieving the selected enabled resource from a storage means; and displaying the selected enabled resource on the display mechanism.

20. The method of claim 17, wherein the step of selecting a hypertext section further comprises:

retrieving a document section referenced by the hypertext; and displaying the retrieved document in the document viewing window.

21. The method of claim 17, wherein after multiple documents have been retrieved, the method further comprises navigating between documents.

22. The method of claim 21, wherein the navigation comprises:

displaying navigation options;

inputting a selected option to navigate to a desired document;

performing the navigation operation; and displaying the desired document.

23. The method of claim 22, wherein the navigation options comprise at least a forward and backward option.

24. The method of claim 17, wherein the step of selecting at least one enabled resource comprises selecting a resource from one of a building code resources section and an accessibility resources section.

25. The method of claim 24, wherein the step of selecting at least one enabled resource comprises selecting from the building code resources section from at least one of the BOCA International Building Code, the UBC, the SBC, the NFPA, state regulations, and local regulations.

26. The method of claim 24, wherein the step of selecting at least one enabled resource comprises selecting from the accessibility resources section from at least one of the ADA Accessibility Guidelines, the Fair housing Accessibility Guidelines, ANSI, and UFAS.

27. The method of claim 17, wherein the step of selecting at least one enabled resource further comprises selecting from a directories section including at least a Fire Resistance Directory.

28. The method of claim 17, wherein the step of selecting at least one enabled resource comprises selecting from format resources comprising CSI MasterFormat divisions.

29. The method of claim 17, wherein the step of selecting a search term from physical environmental features comprises selecting from at least one of a building search term, an interior search term, a circulation and parking area search term, a common search term, a unit search term, a kitchen search term, a bath search term, a storage search term, a utility search term, and an exterior search term.

30. The method of claim 17, wherein the step of selecting a search term from assembled building components search terms comprises selecting from at least one of a framing search term, a wall search term, a floor search term, a roof search term, a vertical circulation search term, a window search term, a door search term, a mechanical search term, an electrical search term, and a plumbing search term.

31. The method of claim 17, wherein the step of selecting a search term from building elements search term comprises selecting from sixteen numbered search terms that follow the Construction Specification Institute's MasterFormat sixteen Division numbering system.

32. The method of claim 17, further comprising the step of allowing the user to enter a keyword as a search term and search the resource storage means.

* * * * *